United States Patent [19]
Chen et al.

[11] Patent Number: 5,960,170
[45] Date of Patent: Sep. 28, 1999

[54] EVENT TRIGGERED ITERATIVE VIRUS DETECTION

[75] Inventors: Eva Chen, Cupertino; Steven Yuen-Lam Lau, Santa Rosa; Yung-Chang Liang, Sunnyvale, all of Calif.

[73] Assignee: Trend Micro, Inc., Taiwan

[21] Appl. No.: 08/820,649

[22] Filed: Mar. 18, 1997

[51] Int. Cl.[6] .................................................. G06F 11/00
[52] U.S. Cl. .............. 395/183.14; 395/186; 395/183.02; 395/187.01
[58] Field of Search .............................. 395/186, 187.01, 395/188.01, 183.14, 183.13, 183.15, 184.01, 183.02, 200.54; 380/3, 4, 23, 25

[56] References Cited

U.S. PATENT DOCUMENTS

| | | | |
|---|---|---|---|
| 5,159,685 | 10/1992 | Kung | 395/183.02 |
| 5,319,776 | 6/1994 | Hile et al. | 395/575 |
| 5,440,723 | 8/1995 | Arnold et al. | 395/183.14 |
| 5,473,769 | 12/1995 | Cozza | 395/183.15 |
| 5,475,625 | 12/1995 | Glaschick | 395/600 |
| 5,485,575 | 1/1996 | Chess et al. | 395/183.14 |
| 5,491,791 | 2/1996 | Glowny et al. | 395/183.13 |
| 5,544,308 | 8/1996 | Giordano et al. | 395/183.02 |
| 5,696,701 | 12/1997 | Burgess et al. | 395/183.02 |
| 5,696,822 | 12/1997 | Nachenberg | 395/183.14 |

FOREIGN PATENT DOCUMENTS

WO 93/25024  12/1993  WIPO ............................ G04L 19/00

OTHER PUBLICATIONS

Qasem et al., "AI Trends in Virus Control", Southeastcon Proceedings, IEEE, pp. 99–103, 1991.

*Primary Examiner*—Joseph E. Palys
*Attorney, Agent, or Firm*—Skjerven, Morrill, MacPherson, Franklin & Friel LLP; Norman R. Klivans

[57] ABSTRACT

The iterative detection and treatment of viruses using virus detection objects and virus treatment objects is disclosed. Pursuant to a request for a virus scan, a virus detection object is produced by a server and is transmitted to a client for execution. The client receives and executes the virus detection object, and the results are transmitted to the server. The server uses the results to produce an additional virus detection object which is also transmitted to the client and executed so that the results can be transmitted to the server. The iterative production and execution of virus detection objects is continued until a determination is made as to whether the targeted file or data includes a virus. Upon a determination that a targeted file or data includes a virus, a vaccine specifically tailored to the conditions presented at the client and the type of virus detected is produced, preferably in the form of a virus treatment object. The request for a virus scan can be directly made or indirectly by a triggering event. One virus detection server embodiment includes a virus information expert system that applies conditional data to predetermined knowledge about virus scanning to make determinations such as when to scan for viruses. A network diagnosis and treatment application includes a diagnostic data module, an expert system, and a maintenance requesting module. The expert system applies the diagnostic data to predetermined knowledge about the diagnosis and maintenance of a network to make determinations upon which maintenance requests are made. Preferably, the expert system includes a virus information expert system.

28 Claims, 9 Drawing Sheets

475

| Platform | Virus Type | Virus Identifier |
|---|---|---|
| I | file type (e.g. .exe, .com) | Virus A |
| I | application data file (e.g..doc) | Virus B |
| I | file type | Virus C |
| I | applet (e.g. Java) | Virus D |
| I | file type | Virus E |
| II | file type | Virus F |

| Virus Identifier | Segregated Virus Component String Data | | | |
|---|---|---|---|---|
| Virus A | String A1 | String A2 | String A3 | ... |
| Virus C | String B1 | String B2 | String B3 | ... |
| Virus E | String C1 | String C2 | String C3 | ... |
| ... | ... | ... | ... | ... |
| | | | | |

Fig. 4D

EVENT TRIGGERED ITERATIVE VIRUS DETECTION

BACKGROUND OF THE INVENTION

1. Field of the Invention

The present invention relates generally to the detection of viruses in computer files and more particularly to the detection and treatment of viruses using network resources, the iterative detection and treatment of viruses, and the maintenance of computer networks.

2. Description of the Related Art

Computer viruses continue to be problematic to computers and computer users. Such viruses are typically found within computer programs, files, or code and can produce unintended and sometimes damaging results. One type of virus is a portion of program code that produces copies of itself in other programs, allows the programs to perform their regular operations, and surreptitiously performs other, unintended actions. Other types of viruses include, without limitation, the following: worms, logic bombs, time bombs, trojan horses, and any malicious program or code residing in executable programs, macros, applets, or elsewhere. While advances have been made in the detection of viruses, the proliferation of computers and the increasing interconnection of, and communication between, computers have also increased the opportunities for the spread of existing viruses and the development of new computer viruses. Thus, the number and type of viruses to which a computer or computer system is potentially exposed is ever changing. This is one reason that the information used to detect viruses requires seemingly constant revision and augmentation in order to detect the various strains of viruses.

There are various methods for detecting viruses. One method of detection is to compare known virus signatures to targeted files to determine whether the targeted files include a virus signature and, thus, the corresponding virus. The comparison data used for virus detection might include a set of such known virus signatures and, possibly, additional data for virus detection. Typically, the comparison data is maintained in a computer storage medium for access and use in the detection of viruses. For example, for a personal computer the comparison data might be stored on the computer's hard disk. Periodically, comparison data updates are provided to detect new or different forms of viruses. The comparison data updates are typically provided on some source storage medium for transfer to the storage medium used to maintain the comparison data. For example, an update might be provided on a floppy disk so that a personal computer user can transfer the comparison data update from the floppy disk to the computer hard disk to complete the update.

The comparison data is essentially discrete and static. That is, all of the information used for the detection of viruses generally remains constant unless it is updated or altered by the user or other relevant party or action. This can be problematic because the quality of information used to detect viruses is reliant upon some form of comparison data maintenance. Another problem with updatable comparison data is that the comparison data can quickly lose its efficacy due to the existence of new and different viruses. Thus, while a periodic update might seem effective, there is no telling how many new and different viruses could be produced in the interim. Still another problem with comparison data updates is that a transfer of an entire replacement set of data, or at least a transfer of all the new virus detection data, is typically undertaken in order to complete the update. Whether an entire replacement or all of the new virus detection data is involved, a significant amount of data must be transferred for the update. More specifically, if a user updates her virus detection information using, for example, an update provided on a floppy disk, at least all of the new virus detection information is transferred from the floppy disk to the appropriate medium.

Regardless of the update source, the problems of updatable comparison data remain. Specifically, the user, administrator, or other relevant party is still typically responsible for accessing and updating the comparison data, the comparison data can quickly and unpredictably lose its efficacy, and a significant amount of data must be transferred from the source to the storage medium used for the comparison data. Indeed, the amount of data to be transferred may be more problematic where internet resources are the source of the comparison data update since a significant amount of computational resources would be used to complete the update.

Another problem in the detection of viruses is that conditions vary from computer to computer. Thus, a first computer or medium could require a first type of scanning while another computer or medium, even one in the same network as the first, could require a second type of scanning. In these instances, virus scans can be overinclusive in that the scanning for viruses that could not possibly reside at the computer, and can be underinclusive if an exhaustive scan for the types of viruses likely to reside at the computer, based upon the conditions presented at the computer, is not undertaken. To adequately perform a virus scan according to the conditions particular to a computer, a user or other relevant party typically must configure the scan. This can be problematic because of reliance upon party input. Additionally, the conditions pertaining to a particular computer and the requisite type of scanning can change.

With the increasing interconnection and communication between computers, the requirements for maintaining computers residing on a computer network have also increased. Again, maintenance is typically undertaken directly by a person, such as the network administrator, using resources which are locally available to the network administrator. For example, in the treatment of computers on a local area network for viruses, an administrator could commonly configure the computers to access locally available virus scanning resources. This maintenance scheme is problematic in its reliance upon updates, its failure to adapt to changing conditions, and its failure to make adequate use of resources external to the local area network.

Accordingly, there remains a need for virus detection that obviates some of the problems inherent in the updatable comparison data model. Additionally, there remains a need for more effective implementation of internet resources for virus detection and for easier and more effective computer network maintenance, particularly, by way of example, with respect to virus detection and elimination.

SUMMARY OF THE INVENTION

In accordance with the present invention a virus detection server is provided for centralized access and iterative techniques are provided to effectively detect and treat viruses.

In one aspect of the present invention, viruses are iteratively detected at a client computer. A substantial portion of the tools and information required for the detection and treatment of viruses is provided in a centralized location such as a server, preferably an internet or world wide web server. This virus detection server operates in conjunction with a client to determine whether viruses reside at the client. A virus scan is initiated when a request is received or directed at the virus detection server. The request is direct or can be initiated by various triggering events, such as a programmed request from the client that does not require ongoing user initiation such that the scan is initiated without a request that it apparent to the user.

Once it is determined by the virus detection server that a valid virus detection request has been received, the virus detection server operates to iteratively detect and treat viruses associated with the requester, typically the client. The iterative production of virus detection objects allows objects to be specifically tailored according to previously determined conditions and/or conditions discovered as a result of the execution of previously produced virus detection objects. Specifically, a virus detection object is produced by the virus detection server and is transmitted to the client. The virus detection object includes an executable program which the client includes a corresponding executing engine. Thus, when the client receives the virus detection object, it executes the object and produces a result that is transmitted back to the virus detection server. The results of the execution of the virus detection object are transmitted to the virus detection server so that the server can produce additional virus detection objects based upon the results of the execution of the previous virus detection object or objects.

According to another aspect of the present invention, the virus detection server produces a vaccine specific to the conditions presented at the client, including the specific type of virus that was detected. The virus detection server receives the results produced by the execution of one or more virus detection objects and uses the results to tailor the vaccine. For example, the result may indicate that a specific virus is present in a specific type of file on a specific platform, and the vaccine is tailored accordingly. The vaccine comprises one or more virus treatment object which include an executable program and/or a data set. The virus treatment objects are sent to and executed at the client to treat the viruses.

According to still another aspect of the present invention, a system of computers such as those residing on a local area network can be effectively screened for viruses without requiring constant maintenance on the part of a system administrator. Specifically, events that regularly occur can be used to trigger a request for virus scanning by the virus detection server.

An embodiment of the virus detection server includes various modules for the iterative detection and treatment of computer viruses. An iterative virus detection module includes a scanning module, a virus pattern module, a virus rules module, a cleaning module, a cleaning pattern module, an access managing module and an access data module. The scanning module includes a plurality of routines for detecting viruses which are provided such that they can be separately accessed. Similarly, the virus pattern module and the virus rules module respectively include groups of virus signatures and groups of rules that can be separately accessed. The iterative virus detection module operates in conjunction with the scanning module, the virus pattern module, and the virus rules module to produce virus detection objects that are specifically provided for the detection of viruses based upon the conditions presented at the client.

The cleaning module includes routines for treating files that are determined to include a virus. A plurality of routines that can be separately accessed are provided in the cleaning module, as are a plurality of virus detection patterns in the virus detection module. The iterative virus detection module operates in conjunction with the cleaning module and the cleaning pattern module to produce virus treatment objects that are tailored for the treatment of the particular virus or viruses that are detected at the client in the prevailing conditions presented at the client.

The access managing module includes routines for determining whether a request for virus scanning has been provided and for validating the request upon such a determination. The access managing module operates in conjunction with the access data module, which includes information pertaining to potential users, in order to acknowledge and validate virus scanning requests.

According to still another aspect of the present invention, another embodiment of a virus detection server includes a virus information expert system. Conditional data pertaining to the conditions presented at computers, media, or other scanning targets is gathered and maintained. The conditional data is applied to predetermined knowledge to make determinations used in conducting a virus scan. An embodiment of the expert system includes an inference engine and a virus knowledge module. The inference engine accesses the conditional data and applies the conditional data to rules and information provided in the virus knowledge module to make determinations about the type of virus scanning to be performed. Exemplary determinations include the determination of whether a scan is appropriate, the assessment of conditions pertaining to the request for scanning, and the type of scanning and cleaning routines to be implemented.

According to still another aspect of the present invention, a network diagnosis and maintenance application is provided. The network diagnosis and maintenance application gathers information about a network and maintains diagnostic data corresponding to the gathered information. Determinations about network conditions are made by applying the diagnostic data to predetermined knowledge, and request for network maintenance are requested based upon the determinations. An embodiment of the diagnosis and maintenance application includes a diagnostic data module, a maintenance requesting module, and at least one expert system with an inference engine and predetermined knowledge. The diagnostic data module provides the diagnostic data, which is accessed by the expert system and then applied to rules pertaining to its field of expertise to make determinations about the network. The determinations are then used by the maintenance requesting module as a basis for requesting network maintenance. An exemplary expert system is a virus information expert system including an inference engine and a virus knowledge module. The determinations made by the virus information expert system are communicated to the maintenance requesting module, which can use the determinations to request virus scanning and treatment by a virus detection server.

BRIEF DESCRIPTION OF THE DRAWINGS

These and other more detailed and specific features of the present invention are more fully disclosed in the following specification, reference being had to the accompanying drawings, in which:

FIG. 4C is an exemplary data table illustrating indexed information corresponding to viruses.

FIG. 4D is an exemplary data table illustrating virus signature component strings used with a virus detection technique in accordance with the present invention.

DETAILED DESCRIPTION OF THE INVENTION

Figure 1:
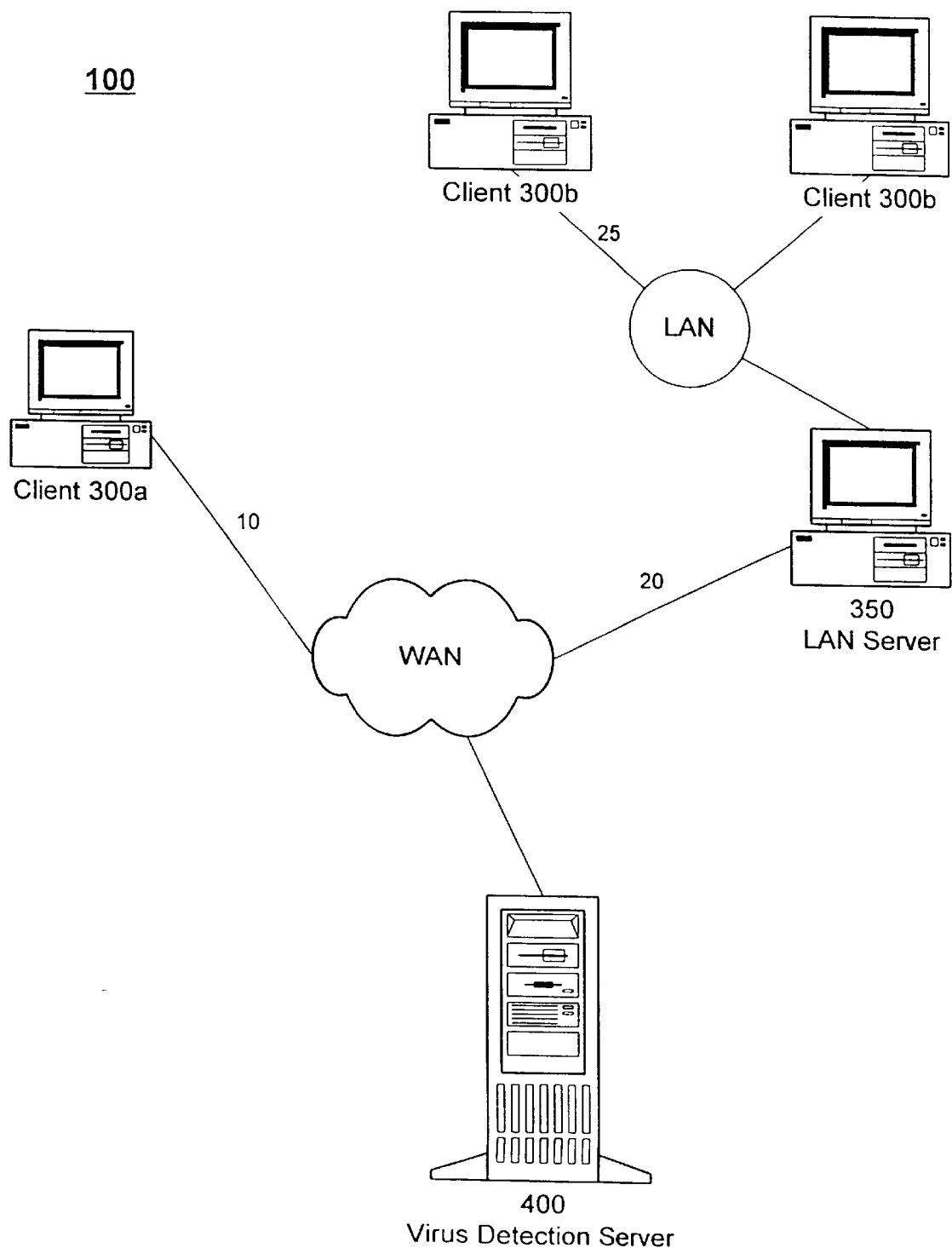
FIG. 1 is a schematic illustrating exemplary interconnections between a client and a virus detection server in accordance with the present invention.

Referring now to the schematic diagram of FIG. 1, the virus detection server and the method of virus detection of the present invention preferably operate on a system 100 wherein a client-server relationship can be established between the virus detection server 400 and any one of a plurality of clients 300. In the system 100 illustrated in FIG. 1, the virus detection server 400 resides on a wide area network (WAN) such as the network typically referred to as the Internet or World Wide Web. Various exemplary interconnections are shown between clients 300 and a virus detection server 400. In one example, the client 300a is shown coupled via line 10 to the WAN to allow communication between the client 300a and the virus detection server 400. In this example, particularly where the WAN is the Internet, access can be provided by an internet access provider or an internet service provider and the client 300 includes a modem coupled to a telephone line to link to the service or access provider. In another example, the client 300b is part of a local area network (LAN) and communication between the client 300b and the virus detection server 400 can be facilitated by a connection 20 established through a LAN server 350. Although access can also be through an access or service provider, the connection 20 can be by other conventional means such as a leased line.

Although the preferred embodiment of the present invention contemplates that the virus detection server 400 is an Internet server, the ordinarily skilled artisan will recognize the various alternatives for establishing a client-server connection between the virus detection server 400 and a client 300, such as interconnection within a local area network of computers or over any internetwork connection of computers.

The virus detection server 400 uses a conventional operating system such as UNIX or Windows NT and implements conventional internet communication protocols such as the transmission control protocol/internet protocol (TCP/IP) suite. Additionally, the communication protocols can include various conventional application layer protocols such as the file transfer protocol (FTP) and/or the Hypertext Transfer Protocol (HTTP) for the transfer of files or other information between the client 300 and the virus detection server 400.

After communication between the virus detection server 400 and the client 300 are conventionally established, the virus detection server 400 operates to determine whether a virus is associated with a client 300 and, where a virus is detected, to provide appropriate treatment for the type of virus that is detected. Briefly, the virus detection server 400 operates in conjunction with the client 300 to determine whether viruses reside at the client by iteratively producing virus detection objects at the server, transmitting the virus detection objects to the client, executing the virus detection objects at the client, and using the results of the execution of the virus detection objects, particularly the current virus detection object, to produce subsequent virus detection objects and ultimately to detect the presence of a virus. Additionally, a vaccine comprising one or more virus treatment objects is tailored to treat the conditions as determined by the iterative production and execution of the virus detection objects.

Figure 2:
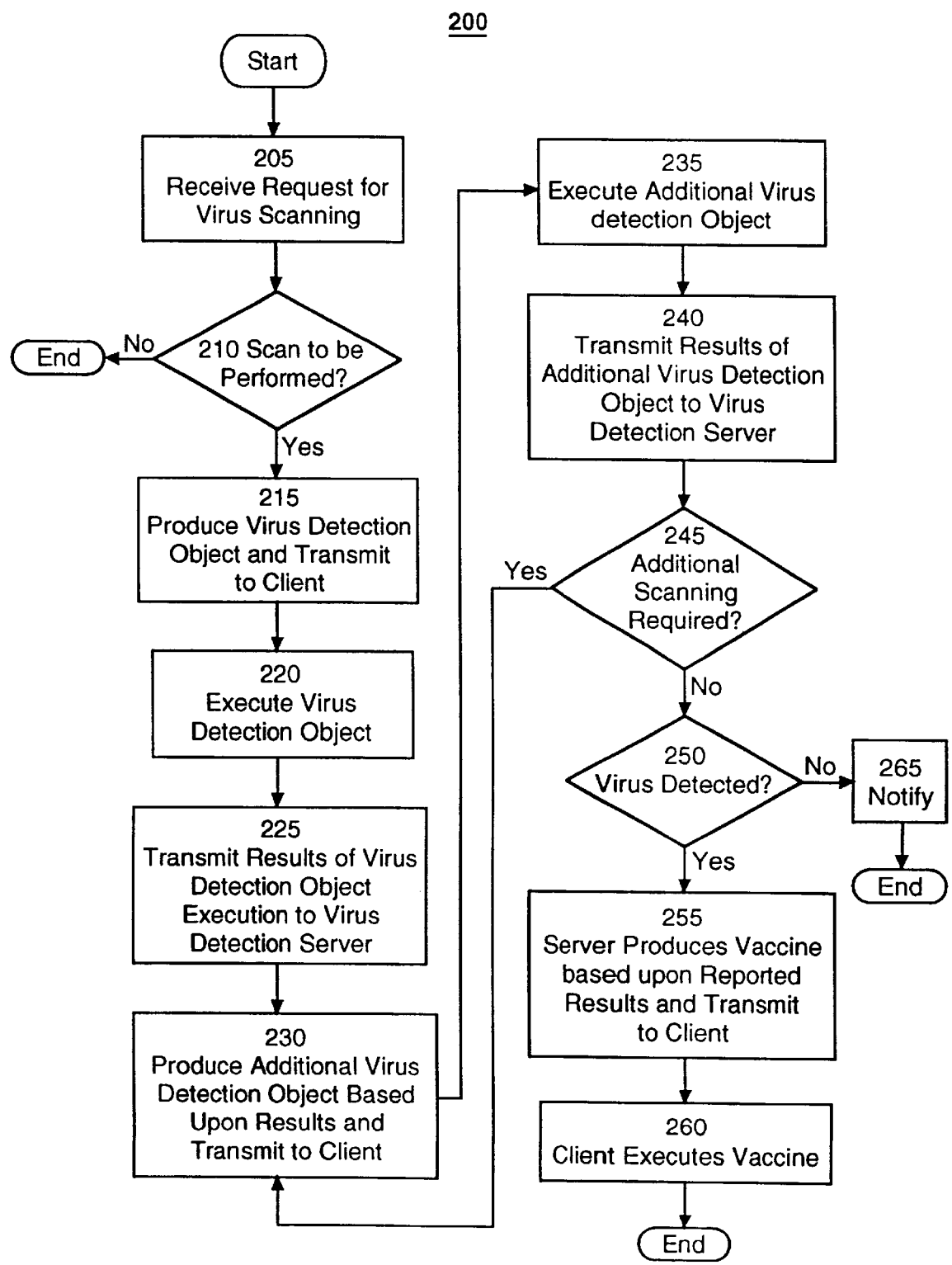
FIG. 2 is a flow diagram illustrating a method of iterative virus detection in accordance with the present invention.

Referring now to FIG. 2 along with FIG. 1, a flow diagram illustrating a method 200 of iterative virus detection in accordance with the present invention is described. FIGS. 1 and 2 provide a general understanding of iterative virus detection. An embodiment of a virus detection server 400 and method for detecting viruses are described in further detail with reference to FIGS. 3–5 below.

In an initial step 205, a request for a virus scan is received, typically from a source external to the virus detection server 400 such as a client to be scanned. After receipt of the request, in step 210 it is determined by the virus detection server 400 whether a scan is to be performed. Preferably, a validation of the virus scan request is performed pursuant to the determination of whether a scan is to be performed. Continuing with a typical example, the request can be provided by the client 300 in the form a request directed to the virus detection server 400, whereupon the virus detection server 400 can validate the request before proceeding with the determination of whether a virus is associated with the client 300. Preferably, request validation is made by reference to information stored at or accessible to the virus detection server 400.

The conventional protocols of the network, such as the WAN in the embodiment of FIG. 1, are used to route the request from the client 300 to the virus detection server 400. For example, the request can implement a uniform resource locator (URL) address corresponding to the virus detection server 400. Once contact is initiated, conventional protocols, such as the HTTP and FTP referenced above, are used to transfer information between the virus detection server 400 and the client 300. Various alternatives for the establishment of a connection between the client 300 and the virus detection server 400 can be provided. The request for a virus scan can also be routed through a separate server that handles initial requests and, possibly, validates them before passing the client 300 to the virus detection server 400 (and thus the request and the validation would be received together by the virus detection server 400). Additionally, although a connection with and resultant virus detection and treatment for a single client is generally described, a single virus scan request that is received by the virus detection server 400 can cause the server 400 to detect and treat viruses on a plurality of clients 300, such as all of the clients 300b residing on a given local area network.

In addition to direct client 300 prompting, the request for a virus detection scan can be produced as a result of a triggering event. Thus, a virus detection scan can be initiated without user input, or knowledge in certain instances. As with a user prompted request, the triggering event causes a request for a virus scan to be transmitted to the virus detection server 400, which receives the request and validates it prior to the progression of the determination of whether a virus is associated with the client 300. An agent program, resident at the client 300 or elsewhere, can be used to produce the request for a virus scan in reaction to the triggering event. In that instance, the agent program initiates the request and resultant connection between the client 300 and the server 400. The request for a virus scan, validation of the request, triggering events, and agent program are described in further detail with reference to the event diagram of FIG. 5, described below.

After it is determined 210 that a scan is to be performed, a plurality of virus detection objects are produced by the virus detection server 400 and transmitted to the client 300 until it is determined whether a virus is associated with the client 300. In step 215, an initial virus detection object is produced by the virus detection server 400 and transmitted to the client 300. The virus detection objects include a program or code that the client 300 is capable of executing as well as data. Alternatively, selected virus detection objects might consist of executable code only, or data only. Conventional network transmission protocols are used to transmit the virus detection object from the server 400 to the client 300. After receipt of the virus detection object, in step 220 the virus detection object is executed by the client 300 and in step 225 the results of virus detection object execution are transmitted to the virus detection server 400 which receives the results and in step 230 produces an additional virus detection based upon the result of the execution of the first virus detection object. The extent of the results transmitted to the server 400 can vary. For example, the results can dictate the production of the additional virus detection object directly, can be raw results such as data that requires interpretation by the server 400 in order to produce the additional object, or can be intermediate to the two extremes. Additionally, the extent of the results can be structured according to the desired allocation of resources between the client 300 and the virus detection server 400. As with the initial virus detection object, the additional virus detection object is transmitted to the client 300 so that, as shown in step 235, it can be executed, and then results are transmitted to the virus detection server 400. The production of virus detection objects continues until a determination is made in step 245 as to whether additional scanning is no longer required. Preferably, the determination 245 is made by the virus detection server 400 based upon the last received result, but it is understood that the client 300 can make the determination and include the determination in the result that is transmitted to the client. If in step 245 it is determined that additional scanning is required, then the method returns to step 230 wherein an additional virus detection object is produced.

By proceeding with the determination of whether a virus is associated with the client 300 in iterative fashion, the information transmitted from the server 400 to the client 300 is tailored to include only that information necessary for the detection of viruses at the client 300. Specifically, the information can be limited to detect the type of viruses that are likely to reside at the client based upon the conditions presented at the client (such as platform or file type), or could be limited to the type of virus detection request made by the client. This significantly reduces the overall amount of information necessary for the detection of viruses and, likewise, reduces the amount of information to be transmitted from the server 400 to the client 300. Additionally, the client 300 has access to state of the art virus detection information since the information used by the virus detection server 400 can be maintained without requiring client 300 action. Moreover, there is no need for the client 300 to engage in a comprehensive downloading of an entire virus detection comparison data update. Finally, computational overhead on the client side is minimized since the virus detection objects and any executable portions thereof are tailored to the conditions presented at the client 300.

If, as a result of the iterative production, transmission and execution of virus detection objects, it is determined in step 250 that a virus is not associated with the client 300, then the client 300 or other relevant party is appropriately notified in step 265 by the virus detection server 400. However, if a virus is detected, then in step 255 the virus detection server 400 produces and transmits to the client 300 a vaccine tailored for the treatment of the type of virus that was detected. Finally, in step 260, the vaccine is executed by the client. By tailoring the vaccine according to the results of the execution of the virus detection objects, the amount of information transmitted to and the computational resources consumed at the client 300 are minimized while an up to date treatment protocol is implemented. Preferably, the vaccine comprises at least one virus treatment object produced by the virus detection server 400 based upon the results of the iterative virus detection object execution. Additionally, as with the virus detection objects, a plurality of virus treatment objects can be produced to iteratively treat the client 300. Specifically, a first virus treatment object can be transmitted to the client 300 for execution to ascertain additional information, such as system information or information input by the user, for the treatment of the virus. Then, a second virus treatment object is produced based upon the results of the execution of the first virus treatment object, and is transmitted to the client 300 for execution.

Figure 3:
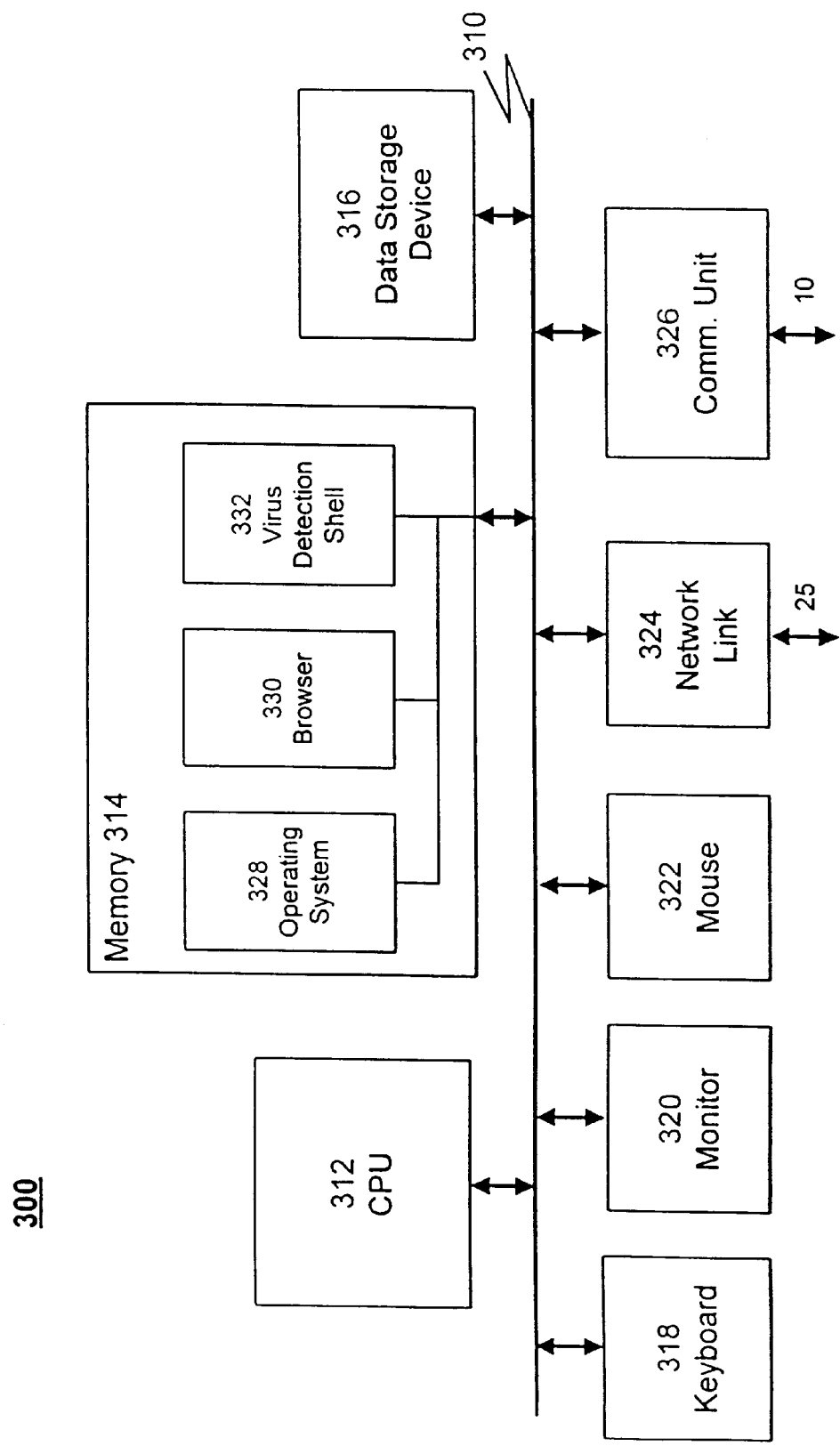
FIG. 3 is a block diagram illustrating an embodiment of a client in accordance with the present invention.

Referring now to the block diagram of FIG. 3, an embodiment of a client 300 used in accordance with the present invention is shown. The client 300 includes a central processing unit (CPU) 312, a memory 314, a data storage device 316 such as a hard disk, a keyboard 318, a monitor 320, a mouse 322, a network interface 324 and a communications unit 326. The CPU 312 is coupled to the memory 314, data storage device 316, the keyboard 318, the monitor 320, the mouse 322, the network interface 324 and the communications unit 326 via a system bus 310 in a conventional architecture. The CPU 312 is preferably a microprocessor such as a Pentium as provided by Intel of Santa Clara, Calif. Additionally, the monitor 320, keyboard 318, and mouse 322 are conventional and configured to provide and receive data as is well known. The communications unit 326 is a conventional device configured to allow communication between the client 300 and other computers. Preferably, the communications unit 326 is a conventional modem connected to a line 10 such as a conventional telephone line. The network interface 324 is also a conventional device configured to allow communication between the client 300 and other computers. Preferably, the network interface 324 is a conventional network adapter card including a transceiver that is coupled to a network transmission medium 25 such as a coaxial, twisted pair, fiber optic, or other line. As shown in FIG. 1, communication between the client 300 and the virus detection server 400 can be facilitated through the network interface 324 or, alternatively, the communications unit 326.

In conventional fashion, the CPU 312 can be directed by instructions provided in memory 314 to perform desired functions. Additionally, input can be provided by the mouse 322 and keyboard 318 and output to the monitor 320 in conventional fashion, and communication between the computer and other devices can be facilitated through the communications unit 326 and/or the network interface 324 in conventional fashion.

The memory 314 is shown to include an operating system 328, a browser 330, and a virus detection shell 332. The operating system 328 is preferably a conventional one for a personal computer such as Windows95 or WindowsNT as provided by Microsoft, Inc. of Redmond, Wash. The memory 314 may also include application programs such as word processing and spreadsheet programs configured to function using the operating system 328. The browser 330 is preferably a software program for accessing and communicating with other computers. In the preferred embodiment, the browser 330 is Internet Explorer as provided by Microsoft, Inc. The client 300 also includes an engine capable of executing the programs provided in the virus detection objects produced by the virus detection server 400. Although it is understood that the engine could be provided otherwise with the client 300, in accordance with a preferred embodiment of the present invention, the engine is provided in conjunction with the browser 330, and thus the browser 330 is considered to be "enabled" for the execution of the programs provided in the virus detection objects. In the preferred embodiment, ActiveX programming tools, also as provided by Microsoft, Inc., are used in the production of the virus detection objects used in the iterative detection of viruses. ActiveX programming tools are means for producing objects, called "controls" in ActiveX terminology, which objects can include executable code that can reside at a server and can be accessed by a client. The controls can also be transmitted to the client, and, provided that the client includes the means for doing so, executed by the client. In the preferred embodiment the browser 330 is ActiveX enabled and the virus detection objects are ActiveX controls. Various alternatives can be used for the browser 330 and to provide the executable portions of the virus detection objects. For example, the browser 330 could be the Netscape Navigator as provided by Netscape, Inc. Additionally, the virus detection (and treatment) objects can, for example, be applets such as Java applets. Java programming tools are provided by Sun Microsystems, Inc.

The CPU 312, at the direction of instructions received from memory 314, operates to receive virus detection and treatment objects, execute the objects, and transmit results to the virus detection server 400 for the client 300. Preferably, viruses are detected and eliminated without requiring a specific application program. Thus, provided that the client 300 can access the virus detection server 400 to make a request, such as through communications unit 326; make a request and communicate with the virus detection server 400, such as through instructions provided in conjunction with the browser 330; and execute objects produced by the virus detection server 400, such as via an enabled browser 330, viruses can be detected and treated at the client 300 using the virus detection server 400.

Since viruses can be detected and treated at the client 300 using the virus detection server 400 using the enabled browser 330 (or other means to execute the virus detection objects), viruses can be detected and treated without the virus detection shell 332.

However, although the virus detection shell 332 is optional, it can alternatively be provided in memory 314 for various purposes in accordance with the present invention. First, the shell 332, in lieu of the browser 330 can include the means necessary to execute virus detection objects. Additionally, the virus detection shell 332 can provide information used in conjunction with the detection and treatment of viruses. For example, the virus detection shell 332 can include account information or detailed virus detection configuration settings that can be provided to the virus detection server 400 without requiring iterations of object production and execution. Specifically, the virus detection shell 332 could include settings for defining the triggering event for requesting a virus scan or could specify the data storage devices, directories, files, file types, or any other information that could help identify or narrow the type of scanning that is desired by the user.

Figure 4A:
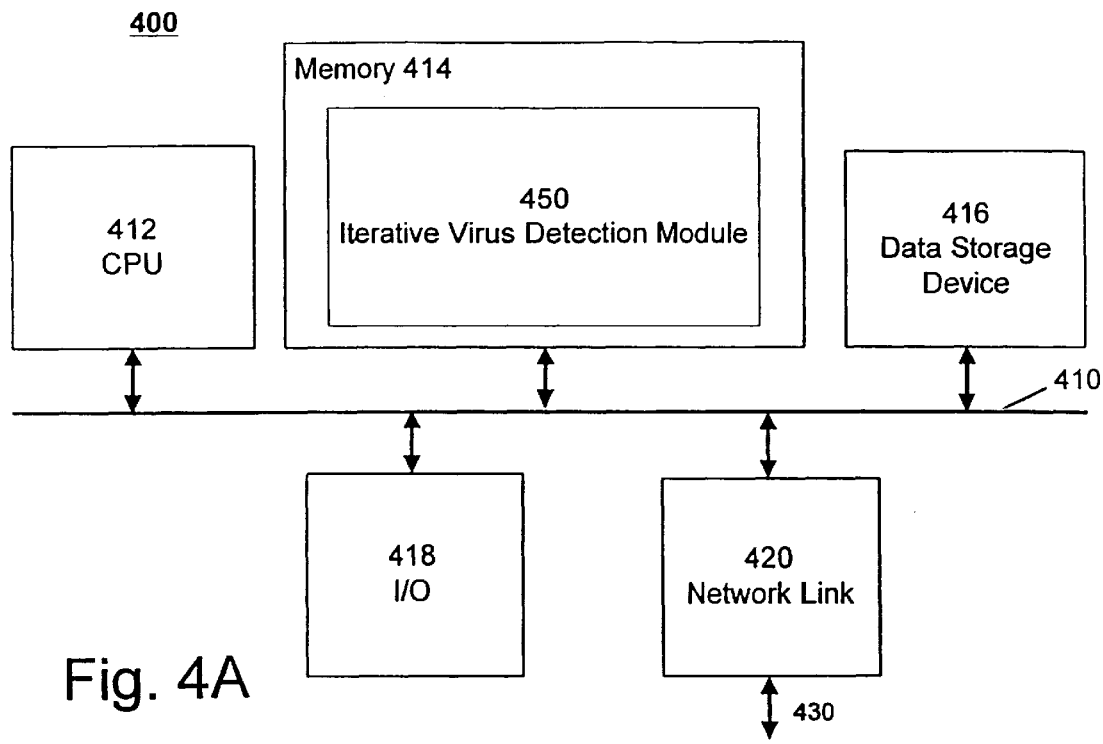
FIG. 4A is a block diagram illustrating an embodiment of a virus detection server in accordance with the present invention.

Referring now to the block diagram of FIG. 4A, an embodiment of a virus detection server 400 in accordance with the present invention is shown. The virus detection server 400 includes a CPU 412, memory 414, a data storage device 416 such as a hard disk, I/O ports 418 and a network interface 420. The CPU 412 is conventional such as a Pentium Pro as provided by Intel Corporation, Santa Clara, Calif. The memory 414 is preferably conventional RAM but may also include conventional ROM. Additionally, the memory 414 is preferably configured to include routines for the iterative detection of viruses. The configurations are described in further detail with reference to the iterative virus detection module 450b of FIG. 4B. The data storage device 416, I/O ports 418 and network interface 420 are conventional and respectively facilitate long term data storage, input and output from the server, and communication with other computers. The CPU 412, memory 414, data storage device 416, I/O ports 418 and corresponding devices, and network interface 420 are coupled to a bus 410 in conventional fashion. The CPU 412, under the guidance and control provided by instructions received from memory 414, provides signals for sending and receiving data through the network interface 420 and transmission line 430 to facilitate communication with other devices such as a client 300. As described with reference to FIG. 1, conventional network communication protocols such as the TCP/IP protocol suite are used for such communication. Additionally, the instructions received from memory 414 allow the virus detection server 400 to produce virus detection and treatment objects and transmit the virus detection and treatment objects to another computer such as the described client 300. The instructions also facilitate the receipt of the results of the execution of virus detection and treatment objects and to use those results to produce additional objects.

Figure 4B:
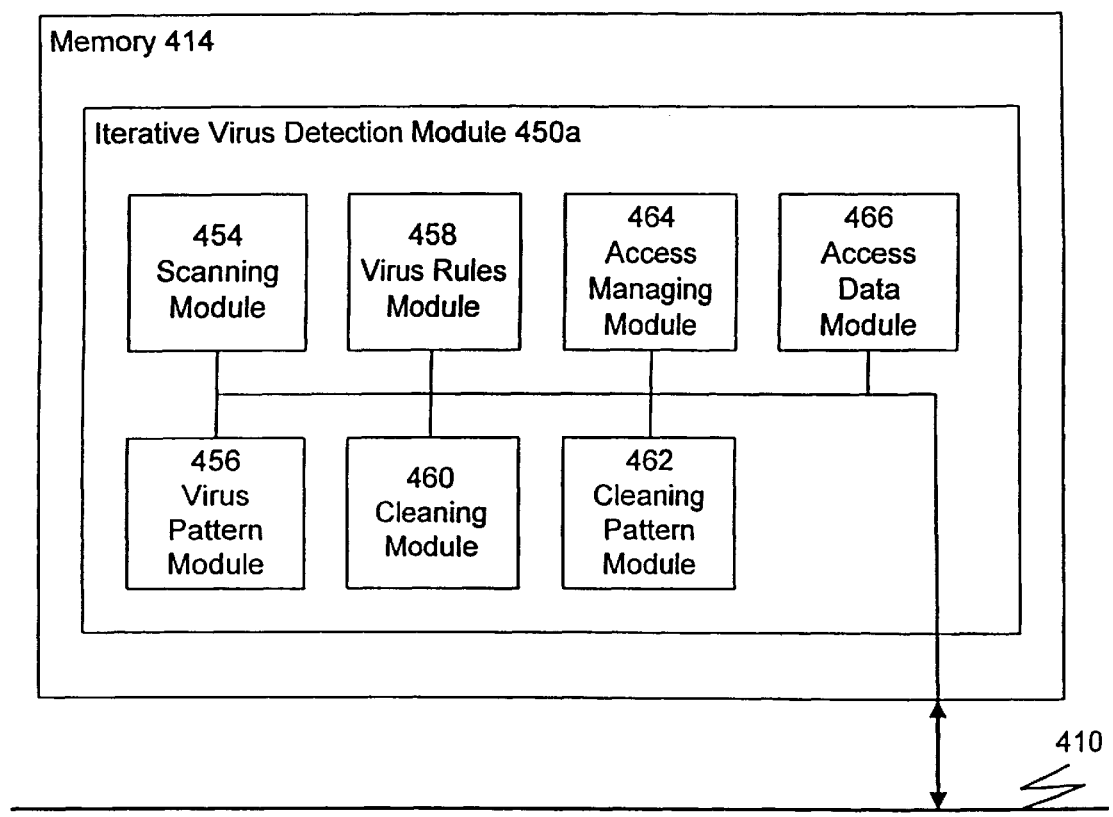
FIG. 4B is a block diagram illustrating an embodiment of an iterative virus detection module in accordance with the present invention.

Referring now to FIG. 4B, an embodiment of an iterative virus detection module ("IVDM") 450b in accordance with the present invention is shown to include a scanning module 454, a virus pattern module 456, a virus rules module 458, a cleaning module 460, a cleaning pattern module 462, an access managing module 464, and an access data module 466. The iterative virus detection module 450b, and its referenced modules, includes routines for receiving virus detection requests, validating requests, producing virus detection and treatment objects, receiving the results of the execution of the virus detection and treatment objects, and using the results to produce additional virus detection and treatment objects to ultimately detect viruses and treat them. The iterative virus detection module 450b is typically implemented in software, but can also be implemented in hardware or firmware.

The access managing module 464 includes routines for determining the validity of virus scanning requests which are received by the virus detection server 400. The access data module 466 is in operative communication with the access managing module 464 and includes information that is used in access validation. For example, information about users including a user identification code and an account validity indicator can be stored in the access data module 466. Thus, when a request for a virus scan is made, the IVDM 450b, in conjunction with the access managing module 464, identifies the requester and uses the data in the access data module 466 to determine whether the user identification code is listed and whether the account is valid. Various alternatives can be implemented for user identification and validation, such as one where a user initiates a request and is prompted for an identification code and a password to validate the requester's access of the virus detection server 400 for the detection and treatment of viruses. The access managing module 464 is also arranged to set up an account for a new user and therefore is configured to acquire the necessary information.

After it is determined that a valid request for scanning has been provided, virus detection objects are iteratively produced and transmitted to the requester, such as a client 300, in order to detect a virus. The scanning module 454 includes various routines that can be used in the detection of viruses. Preferably, the routines are provided for separate access so that virus detection objects can be tailored to include selected scanning routines. For example, separate routines for the detection of viruses that could reside in systems using particular platforms and operating systems, in particular file types, and in particular locations are provided for separate access in the scanning module 454. Specifically, routines for the detection of viruses that typically reside on one platform are provided such that they can be accessed separate from routines for the detection of viruses that typically reside on another platform. Similarly, routines for the detection of viruses that reside in "executable" files (such as those that have the file extension .exe) are provided such that they can be accessed separate from routines used for the detection of macro viruses (such as those that implement the WordBasic programming language, typically reside in application data files, and include extensions such as .doc or .dot). Thus, a virus detection routine that examines a file to determine whether it includes a virus signature can be separated from a virus detection routine that use a set of rules, such as combinations of suspect instructions, to determine whether viruses are present in files. Other types of virus detection routines can be provided in the scanning module 454, such as those used in the detection of viruses in electronic mail messages.

Preferably, the routines provided in the scanning module are configured to use the particular programming tools used by the virus detection server 400 to detect viruses at the client 300. Thus, the routines are capable of being executed by the client 300. Alternatively, the routines provided in the scanning module can be converted from a first executable type to an executable type supported by the client 300.

In the preferred embodiment, various routines are provided for separate access in the scanning module 454. For example, routines corresponding to the detection of virus signatures in various types of files are provided. Information about each routine is provided in association with the routine to facilitate coherent separate access. For example, for virus signature detection routines, information such as that corresponding to platform and file type are provided in association with each routine. Thus, the IVDM 450b, in conjunction with the scanning module 454, can efficiently determine which routine requires access when necessary. Typically, the decision whether to use a particular routine will depend upon the conditions at the client 300. The conditions can be predetermined or can be acquired by the virus detection server 300 through interaction corresponding to scope and risk assessment, described further below with reference to FIG. 5. Conventional indexing and sorting techniques can be used to tag the various virus scanning routines provided in the scanning module 454 and, accordingly, to facilitate separate access.

Similar to the scanning module 454, the virus pattern module 456 and virus rules module 458 respectively include virus signatures and rules that can be used in the detection of viruses. As with the routines described in connection with the scanning module 454, the patterns and rules are provided to facilitate separate access. Thus, for example, the file signatures in the virus pattern module 456 corresponding to one type of file can be separated from the virus signatures corresponding to a second file type. Similarly, the rules in the virus rules module 458 corresponding to one detection criteria can be separated from the virus rules that apply to a second detection criteria. As with the routines in the scanning module 454, conventional indexing and sorting techniques can be used to provide separate access to the patterns and rules. Of course, a plurality of signatures or rules could apply to a particular indexing field. For example, several signatures would correspond to the indexing field .exe and thus would be included, subject to other indexing limitations, in the virus signatures corresponding to such scanning conditions.

In addition to providing routines and corresponding signatures or rules that separately accessible and thus amenable to tailoring according to the assessed scope and risk presented at the client 300, the virus scanning stage is provided such that scanning can be undertaken in iterations.

For example, in a preferred technique a plurality of files, such as all of those residing on a client 300 hard disk 316, are initially scanned to determine whether they include a first portion of a virus signature (or a plurality of virus signature portions). The result of the initial scan will indicate those files, if any, that include the portion. Then, a second scan is undertaken based upon the result of the first scan. Specifically, those files that include the first portion are scanned to determine whether they also include a second virus portion. Those files that include the first portion and the second portion are candidates for inclusion of the entire virus signature and thus the virus. With this technique, the amount of data used as comparison data for the initial scan is minimized since only a portion of the virus signature is required for the scan. Additionally, since the number of files to be scanned is gradually narrowed, the computational resources used in the scan, particularly at the client 300, are lowered.

An exemplary indexing of virus signatures and the preferred signature scanning technique are now described with reference to FIGS. 4c–4d. Referring to FIG. 4c, an exemplary data table 475 is shown to include columns for platform, virus type, and virus identification. In the exemplary table 475, each row includes information about a particular virus. The information can be used to determine whether a scanning routine corresponding to the particular virus will implemented. Of course, various scanning routines will correspond to groups of viruses with common characteristics. The data table 475 provides an example of how various virus information is indexed. Various additional or alternative criteria for determining which scanning and treatment routines to use can be provided.

Preferably, information such as that provided in the exemplary data table 475 is provided in memory 414 for access by the IVDM 450a in the selection of virus scanning and treatment routines and, more specifically, in the production of virus detection and treatment objects. Assuming that, either by iterative object determination in the scope and risk assessment stages, or by user input, or by predetermined settings, that only files type viruses corresponding to a given platform I are targeted for scanning, the target would only be scanned for viruses such as viruses A, C, and E. The scanning routines are provided in the scanning module 454 and are indexed for access. Additionally, virus signatures are provided in the virus pattern module 456 and are indexed for access. Thus, using information such as that shown in the data table columns, the appropriate scanning routines for detecting file type viruses and virus signatures corresponding to viruses A, C and E are accessed. Although a virus detection object including full signatures corresponding to these three selected viruses could be provided in accordance with the present invention, a technique is provided which allows a further reduction in the amount of information required for transmission to the client 300 in order to detect viruses.

Referring now to FIG. 4d, another exemplary data table 480 includes columns for the virus identifier and a column generally indicating segregated virus component string data. As shown, the virus signature for each identified virus is broken into portions that can be used in the detection of viruses. In one embodiment, the portions comprise one byte strings, but it is understood that the length of the string can differ. Specifically, for virus A, strings A1, A2, and A3 are shown, for virus B, strings B1, B2 and B3 are shown, and for virus C, strings C1, C2 and C3 are shown. The table 480 is provided by way of example. It is understood that many additional portions or strings could be provided for each virus. It is also understood that data for many more viruses could be provided.

An iterative, progressive virus scan can be undertaken using virus signature portion data such as that in the data table 480. There are two ways that this type of scanning can be implemented, referred to as the first and second types below.

In the first type of detection, detection is undertaken by iteratively scanning all targeted files for the relevant string portions to progressively narrow the number of viruses that could reside in the targeted files. The virus portions do not have to be adjacent strings in the signature. Once the number of viruses that is potentially present is sufficiently narrowed, a full virus signature corresponding to each possibly present virus is provided so that the appropriate files can be scanned.

In the second type of detection, the scan itself is conducted using the plural virus signature portions. Preferably, the virus portions are adjacent strings in the signature, and the virus detection objects are arranged to detect presence and location within targeted files.

Specifically referring to the first type of detection, an initial virus detection object includes a routine for scanning all of the targeted files to determine whether they include the initial portions or strings A1, B1, and C1. The virus detection is produced by the segregated and indexed data and transmitted to the client 300. The client then executes the virus detection object to produce a result. The result includes an indication as to whether the portions or strings are included in the targeted files and, if so, an identification of which files included which strings. Assuming that 100 files were targeted, that no targeted file included string C1, and 5 of the targeted files included either string A1 or B1 (or both), the result of the execution of the virus detection object would indicate as such. Preferably, the identification of the 5 files remains at the client, and the result transmitted to the virus detection server 400 is that strings A1 and B1 were found (and thus no files with string C1). The virus detection server 400 then uses this result to produce a second virus detection object. In this instance, the second virus detection object would include only strings A2 and B2, since virus C was eliminated from consideration. The second virus detection object is then executed at the client. Specifically, the client scans the 5 identified files to determine whether they include the combination of A1 & A2 or B1 & B2. The results of the previous execution (to find A1, B1, etc.) could be used such that only the second strings would need to be scanned for, or, alternatively, the files could be scanned for both strings. The execution of this virus detection object could thus discount viruses A and B from consideration. Assuming that certain files were found to include both B1 & B2 but no file included both A1 and A2, a full virus signature corresponding to virus B could be provided in the next virus detection object so that the targeted file or files could be scanned to determine whether the virus resides at the client 300. It is understood that using this technique the number of iterations, the number of viruses which remain possibly present, and the number of files ultimately scanned can vary. Regardless, by using a limited amount of comparison data, a screening can be undertaken such that when full virus signatures are finally transmitted to the client 300, their number and the corresponding amount of data to be transmitted are effectively minimized.

In the second type of detection, the strings comprise adjacent portions of the viruses and thus the iterative scan can also detect the virus (rather than just limit the amount of viruses that could be present followed by a full virus signature transmission). In the second type of detection, therefore, additional information about the files including strings and the location of the strings is provided. Specifically, in the second type of detection, if the initial virus detection object indicates that 5 targeted files include A1 or B1, then an identification of which files include which string is retained, as well as a marker so that a determination could be made as to whether the adjacent string A2 or B2 respectively followed string A1 or B1 in a targeted file. In this fashion, the number of viruses which are potentially present can be rapidly minimized and efforts are not duplicated since the full signature does not have to be transmitted after transmission of virus portions.

Although a preferred technique for iteratively detecting viruses and thus minimizing the amount of data to be transmitted to the client is described, other techniques can be provided. Some examples of virus detection techniques that can be modularized or subdivided to provide iterative detection are those used in the detection of unknown viruses in macros and those used in electronic mail scanning. These examples are also discussed with reference to the virus scanning stage in the event diagram of FIG. 5.

Again the routines, patterns and rules for iterative virus scanning are respectively provided for separate access in the scanning module 454, virus pattern module 456 and virus rules module 458. Still referring to FIG. 4B, the IVDM 450b, in conjunction with the virus scanning module 454, the virus pattern module 456 and the virus rules module 458, iteratively produce virus detection objects based upon the results of the execution of previous virus detection objects. Since the routines in the virus scanning module 454 and the rules and patterns in their respective modules 458, 456 are provided such that they can be separated, the IVDM 450*b* can produce virus detection objects that include a limited amount of data that is specifically directed at the type of conditions presented at, for example, a client 300 to be scanned for viruses. For example, where it is indicated by previous iterations (or separately provided input) that only executable files that have not been compressed and reside in a particular directory are to be scanned, the IVDM 450*b* accesses the routines in the virus scanning module 454 that are used for the detection of viruses in executable files, accesses the virus signatures the could be presented in executable files in the virus pattern module 456 and produces a virus detection object using the information. The appropriate virus detection routines from the scanning module 454 and information from the virus pattern module 456 and/or the virus rules module 458 are used to produce the virus detection object. As described previously, the object typically implements a conventional programming language such as that provided in ActiveX controls or Java applets.

Once each virus detection object is produced, it can be transmitted from the virus detection server 400 to the client 300 using conventional network transmission protocols. The computer client 300 executes the virus detection object and transmits the results of the execution for receipt by the virus detection server 400. The IVDM 450*b*, in conjunction with the virus scanning module 454, uses the execution results of the virus detection object to determine whether additional virus detection objects are required, and, where no additional virus detection objects are required, whether a virus was detected. In a preferred method of operation, the iterative production of virus detection objects is divided into separate stages including the scope assessment stage, the risk assessment stage, and the virus scanning stage. In the scope assessment stage, a determination as to the extent of the virus scan is made. In the risk assessment stages, determinations about the conditions presented at the requested site are used to produce objects in the virus scanning stage.

If it is determined by the IVDM 450*b* in conjunction with the scanning module 454, and, where necessary, the virus pattern module 456 and virus rules module 458, that a virus is present, a vaccine is tailored according to the type of treatment desired, the conditions, and the type of virus that is detected. As with the scanning routines and detection information, the routines in the cleaning module 460 and the patterns or other data in the cleaning pattern module 462 are provided for separate access so that the routines and data necessary for the treatment can be separately accessed. Again, the access can be provided by conventional indexing and sorting techniques. Virus treatment objects are produced using the IVDM 450*b* in conjunction with the cleaning module 460. Additionally, as with the virus detection objects, the treatment objects can be iteratively produced using the results of previous objects.

Various remedial routines are provided by the cleaning module 460. Dependent upon the conditions presented at the client 300 and the type of virus detected, the remedial routines can take immediate actions such as deleting a file, stripping out infected portions of a file, or replacing infected portions with a benign portion. In addition to these actions, which are aimed at correcting infected files, the remedial routines can provide warnings to parties that could be affected by the detected virus, and could provide virus specific indications. For example, where a virus is detected within a particular type of Java applet that was downloaded to a client 300 within a network, the network administrator can be notified so that similar entities could be blocked from entering the network.

Figure 5:
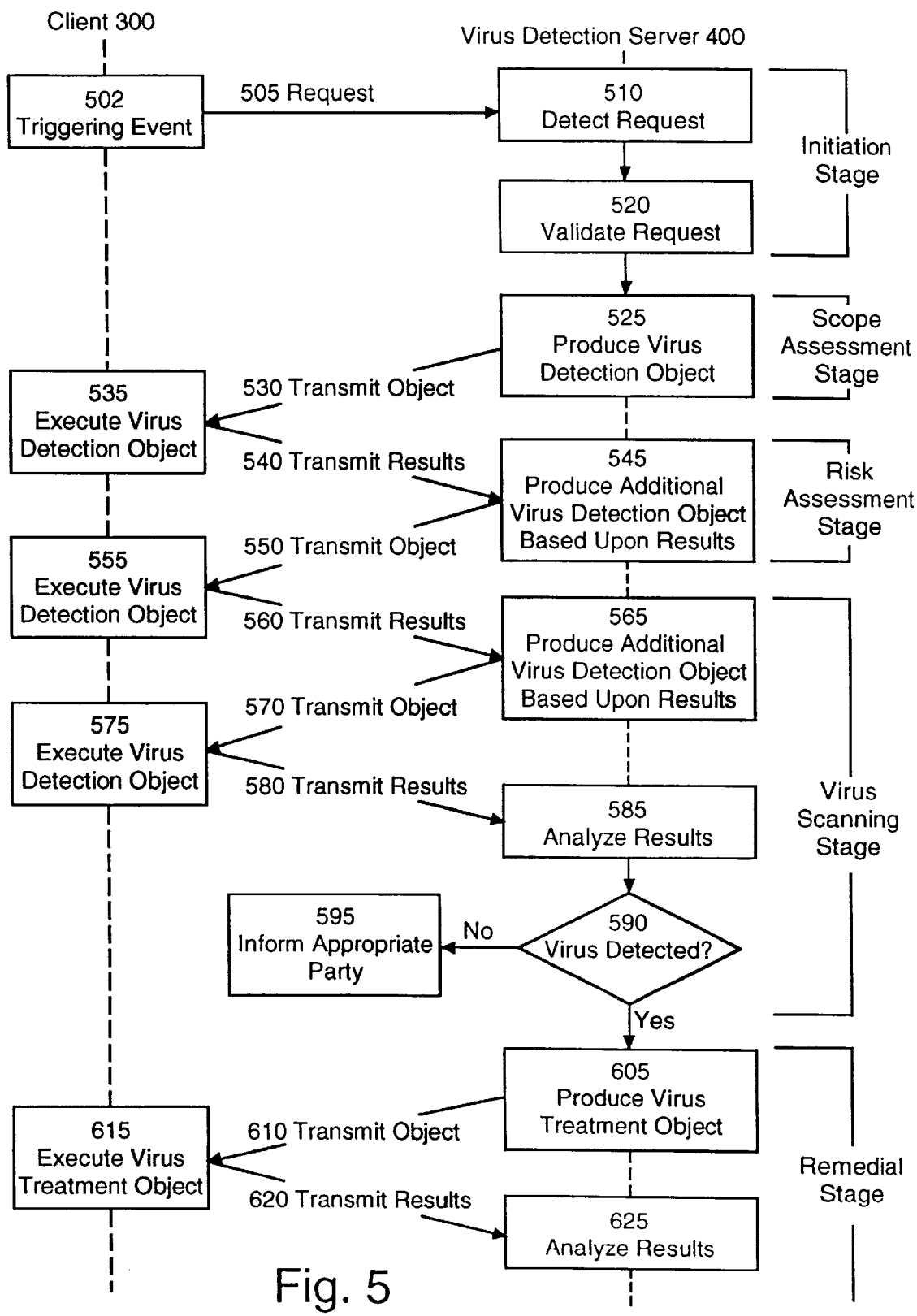
FIG. 5 is an event diagram illustrating a method of virus detection using a virus detection server in accordance with the present invention.

Referring now to the event diagram of FIG. 5, a method of iterative virus detection using the virus detection server 400 is shown to include an initiation stage, a scope assessment stage, a risk assessment stage, a virus scanning stage, and a remedial stage.

The initiation stage is prompted by a request 505 for a virus scan. The request can be initiated directly by a client 300 which accesses the virus detection server 400 using conventional network communication protocols. Although the triggering event 502 that prompts the request 505 is typically initiated directly by the user of the client 300, the request can alternatively be initiated by a triggering event other than user prompting or initiation. This allows for regular virus scanning without requiring user input. Additionally, a group of computers that a user might seek to manage, such as a plurality of computers residing on a LAN, can be subjected to regular virus scanning without requiring user initiation and with minimal use of network resources. Moreover, since the virus detection server 400 can be maintained separately from the stand alone client 300 or the computers 300 on a local area network, there is little or no need for virus detection data maintenance on the part of either the client 300 users or the LAN administrator. Preferably, an agent program is used to provide non-user initiated scanning requests. The agent program gathers information without necessarily requiring the presence or input of the user and initiates a request for a virus scan whenever the gathered information corresponds to a predetermined triggering event.

An exemplary triggering event is the lapsing of a predetermined amount of time since the most recent virus scan. Other triggering events include those likely to facilitate the spread of viruses. These triggering events include attempted internet access, receipt or transmission of electronic mail, or downloading files over the internet. Additionally, a plurality of events in combination, such as the first attempted internet access after a predetermined amount of time has elapsed since the most recent virus scan, can be the triggering event. It is understood that various triggering events in addition to those described above can be provided.

The agent program, upon a detection or determination that the triggering event has occurred, issues a request for a virus scan to the virus detection server 400. Then, the response (after validation) by the virus detection server 400 is "pushed" to the client 300. Conventional programming techniques are used for the agent program and conventional techniques are used to gather the relevant information to determine the triggering event occurrence.

Preferably, where the client 300 is not a part of a local area network such as client 300*a* as shown in FIG. 1, the agent program resides at the client 300*a*. Where the client 300 communicates with the virus detection server 400 through local area network channels such as clients 300*b* as shown in FIG. 1, an agent program can reside at the client 300*b*, or, preferably, can reside at a LAN server 350 (such as a gateway server, a non-gateway LAN server, or a proxy server) capable of monitoring network traffic relevant to the determinations corresponding to the triggering event. Preferably, the agent program is produced using routines provided in the access managing module 464. The agent program is transmitted to the selected location (e.g. client 300*a*, client 300*b*, LAN server 350, proxy server) using conventional network transmission protocols, and can be stored in the client 300 memory 314 or the storage location appropriate to the selected location. Conventional programming languages can be used for the agent program.

The request 505 for a virus scan is detected 510 by the virus detection server 400, and then it is determined 520 whether the request is valid. The routines and rules for the determination of access validity are respectively provided by the access managing module 464 and rules module 466 and are described in connection with the iterative virus detection module 450b. Briefly, the filtering module 464 identifies the request and accesses the rules in the rules module 466 to determine whether the request is valid by reference to the access rules. Existing accounts are typically filtered, but the module 464 is arranged to accept and arrange the origination of new accounts.

Once it is determined that a valid request for virus scanning has been made, the scope assessment stage commences. In the scope assessment stage, the virus detection server 400 typically determines where a scan will be performed. Various information can be determined in the scope assessment stage, such as the media to be scanned, the locations (e.g. directories) to be scanned, or which group of files are to be scanned. A virus detection object to ascertain the scope of the virus scan is produced 525 by the virus detection server 400 and is then transmitted 530 to the client 300 using conventional network communication protocols. Preferably, the virus detection object prompts input by the user at the client 300 to procure information about the scan. One or more predetermined virus detection objects can be indexed and stored in memory 414 for access by the IVDM 450b. One example of a virus detection object procures information including the devices, memories, directories, and files that require scanning.

The client executes 535 the virus detection object in order to gather the relevant information. Of course, user input may be required dependent upon the requirements dictated by the virus detection object. The client 300 also transmits 540 the results for receipt by the virus detection server 400. Preferably, the virus detection object includes a portion for transmitting 540 the results to the virus detection server 400 to obviate the need for continuing user input in the exchange of objects and results. Alternatively, the user can be prompted for simple input, such as clicking a button with the mouse 322 or through keyboard 318 input, in order to cause the transmission 540.

Various alternatives can be provided for the scope assessment stage. The production of a virus detection object corresponding to the stage is not absolutely required. For example, the IVDM 450b can retain virus detection information in the access data module 466, or elsewhere, corresponding to the identification of the requester. Additionally, account information corresponding to particular types of requests can be provided in the access data module 466. The account information can correspond to all of the computers on a LAN and provide all the necessary background information about those computers so that they can be scanned without iterative scope assessment. Alternatively, the information can be provided along with the request for a virus scan, particularly where the client 300 includes a virus detection shell 332. Finally, the virus detection server 400 can rely upon default settings (e.g. scan the entire client 300 hard disk) and thus proceed with a virus scan using the default settings, without inquiry.

After the necessary information is gathered, the risk assessment stage commences. In the risk assessment stage, the determined scope of scanning is analyzed to determine whether and which files or data could contain viruses. Preferably, virus detection objects are produced and transmitted to the client 300 to determine whether and what types of scanning will be required. Where a virus detection object corresponding to the scope assessment stage is provided, the results of its execution at the client 300 can be used in the production of the next virus detection object. Various information is ascertained in the risk assessment stage. Where specific targets are identified, such as specific storage media or directories, the virus detection object is produced 545 to determine whether and what type of scanning is required for the specified targets. For example, the virus detection object is produced 545 to determine the types of files residing in the specified directory (e.g. whether executable files are resident), or the type of storage medium or directory (e.g. whether the client or directory corresponds to a postal node in an electronic mail system) so that the risks presented by the specified targets are evaluated so that subsequent virus scanning can be tailored to the risks presented. As with other virus detection objects, the object includes an executable program (and possibly other data) specific to the task of making the determination.

Specifically, where, for example, a directory is initially specified as the scanning domain per scope assessment, a program for accessing the file header for each file in the specified directory, comparing the file header to predetermined data to determine whether the file is of the type that is likely to contain a virus, and maintaining an identification of those files that are found to be likely virus candidates can be provided in the virus detection object. Various alternatives for the virus detection object or objects corresponding to the risk assessment stage will be evident to the ordinarily skilled artisan.

Preferably, the virus detection object is transmitted 550 to and executed 555 by the client 300 so that results corresponding to the execution can be transmitted 560 to the virus detection server 400. As with the virus detection object corresponding to the scope assessment stage, the virus detection object originally transmitted 550 to the client 300 can include the means necessary for causing the transmission 560 of the results to the virus detection server 400. Preferably, in the risk assessment stage, the transmission 560 is automatic, requiring no user input. Again, the transmissions 550, 560 between the client 300 and virus detection server 400 will implement conventional network protocols.

Although a single virus detection object is shown to correspond to the risk assessment stage, it is understood that a plurality of objects could be iteratively produced within the stage. Additionally, as with the scope assessment stage, default settings, predetermined settings or directly provided input to the virus detection server 400 can be relied upon for the risk assessment stage, obviating the requirement for virus detection objects for both the scope and risk assessment stages. In that instance, the iterative production of virus detection objects corresponds only to the virus scanning stage.

Upon completion of the risk assessment stage, the virus scanning stage commences. The virus detection server 400 iteratively produces a virus detection object or objects based upon the results of previous executions in order to scan for viruses. Thus, the virus detection objects can be specifically produced according to the desired scanning and conditions presented at the client 300. This allows effective virus scanning without requiring an exhaustive transmission of virus detection data to the client 300 to effectuate the scan. As described with reference to the iterative virus detection module 450a, particularly the scanning module 454, virus pattern module 456 and virus rules module 458, the routines, patterns and rules for the detection of viruses are provided such that they can be separately accessed and thereby used to produce specific virus detection objects corresponding to the virus scanning stage. The produced virus detection objects will include executable programs according to the dictates of the information by previous virus detection object iterations or will be otherwise tailored for the conditions presented at the client 300.

Various scanning routines are implemented by the virus detection objects in the scanning stage. For example, where a signature scan of executable files is sought, the virus detection object includes a program for accessing each targeted executable file, determining whether each targeted file includes a string that corresponds to a virus signature from the group of virus signatures that could be expected to be found in the targeted files, and retaining information about the targeted files that are found to include virus signatures. Signature scanning techniques, such as a state engine, can be used determine whether targeted files include virus signatures.

One way that the amount of data to be transmitted from the virus detection server 400 to the client 300 is minimized is that only those virus signatures that could be expected according to the gathered information about the assessed scope and risk from previous stages. For example, where the scope and risk assessment indicate that only .exe files in a particular directory on a particular client drive are to be scanned, virus detection objects are tailored to effect that type of scan. Specifically, those virus signatures which could reside in .exe files and a routine for conducting a signature scan for the files at the noted location are provided in a virus detection object, the object is executed at the client 300, and the results are transmitted to the virus detection server 400 in the detection of viruses.

Although a single virus detection object is shown to correspond to the virus scanning stage, it is understood that a plurality of objects could be iteratively produced. Thus, in addition to the tailoring offered by the scope and risk assessment, the iterative production of virus detection objects can be independently tailored to minimize the amount of information to be transmitted between the server and client and to minimize the use of computational resources.

Various types of scanning are implemented for efficient iterative analysis. An preferred technique which allows exhaustive signature scanning without requiring a comprehensive download of the signature data is described with reference to FIG. 4D above. Other scanning techniques are also provided for iterative virus detection. For example, techniques for the determination of whether a macro includes a virus can be modularized or divided into a plurality of functions which can be performed by separate virus detection objects. To explain, in the detection of known and unknown viruses in macros, combinations of suspect instructions can be used in the determination of whether a file includes a virus. Specifically, a macro that includes both a first suspect instruction and a second suspect instruction can be determined to include an unknown (or known) virus. Thus, in accordance with the present invention, separate virus detection objects are provided to first detect whether and which of several targeted files include a first suspect instruction, and then to determine whether those targeted files that include the first suspect instruction also include the second suspect instruction to detect a virus. To produce a first virus detection object the IVDM 450a operates with the scanning module 454 and the virus rules module 458 to obtain the routines and data required for the detection of the first suspect instruction. After transmission of the first virus detection object from the virus detection server 400 to the client 300 and execution by the client 300, identification of those files that include the first suspect instruction can be identified in the results transmitted to the virus detection server 400. Alternatively, the file identifiers can remain at the client 300 and the result could indicate which suspect instruction was identified. In either case, the virus detection server 400 can use the results to produce an additional virus detection object to determine whether the second suspect instruction is present.

Additionally, techniques for the detection of viruses in electronic mail messages can be modularized or divided to provide for iterative virus detection within the virus scanning stage. Preferably, an initial virus detection object determines whether the whether any unread messages reside at the client 300 (or at a postal node used by the client 300). If the result of that determination indicates that there are unread messages, then additional virus detection objects can determine whether the unread messages include attachments, decode any found attachments, and scan the decoded attachments to determine whether the unread messages include viruses. Although a single virus detection object could be produced for each of the functions of determining whether there are unread messages, determining whether attachments are included, decoding attachments, and scanning decoded attachments, each virus detection object could alternatively perform more than one of the noted functions.

Still referring to FIG. 5, once the virus detection object is produced 565, it is transmitted 570 to the client 300 for execution 575. The results of the execution are transmitted 580 to the virus detection server 400 so that the results can be analyzed 585. As with the risk assessment stage, the virus detection object originally transmitted 570 to the client 300 preferably includes a portion for causing the transmission 580 of the results to the virus detection server 400 without requiring client 300 input by the user or otherwise. The analysis 585 includes an initial determination of whether additional virus detection objects are required for scanning, and, where no additional virus detection objects are required, a determination of whether a virus was detected.

If, as a result of the virus scanning stage, it is determined 590 that a virus was detected at the client 300, then the remedial stage commences. A vaccine in the form of a virus treatment object is tailored according to the type of treatment desired, the conditions presented at the client 300, and the type of virus that is detected. As described regarding the IVDM cleaning module 460 and cleaning pattern module 462, various remedial routines which can be accessed separately for production of the tailored virus treatment object are provided. Additionally, various remedial actions may be undertaken, including deleting a file, stripping out infected portions of a file, or replacing infected portions with a benign portion. Once the virus treatment object is produced 605 it is transmitted 610 to the client 300 so that it can be executed 615 for appropriate treatment of the virus. Optionally, the results of the treatment can be transmitted 620 to the virus detection server 400 so that the results can be analyzed 625. As with the virus detection objects, conventional network transmission protocols are used to transmit the objects to and from the virus detection server 400, and, although a single iteration is shown, a plurality of virus treatment objects can be implemented to effectuate the appropriate remedy.

Figure 6A:
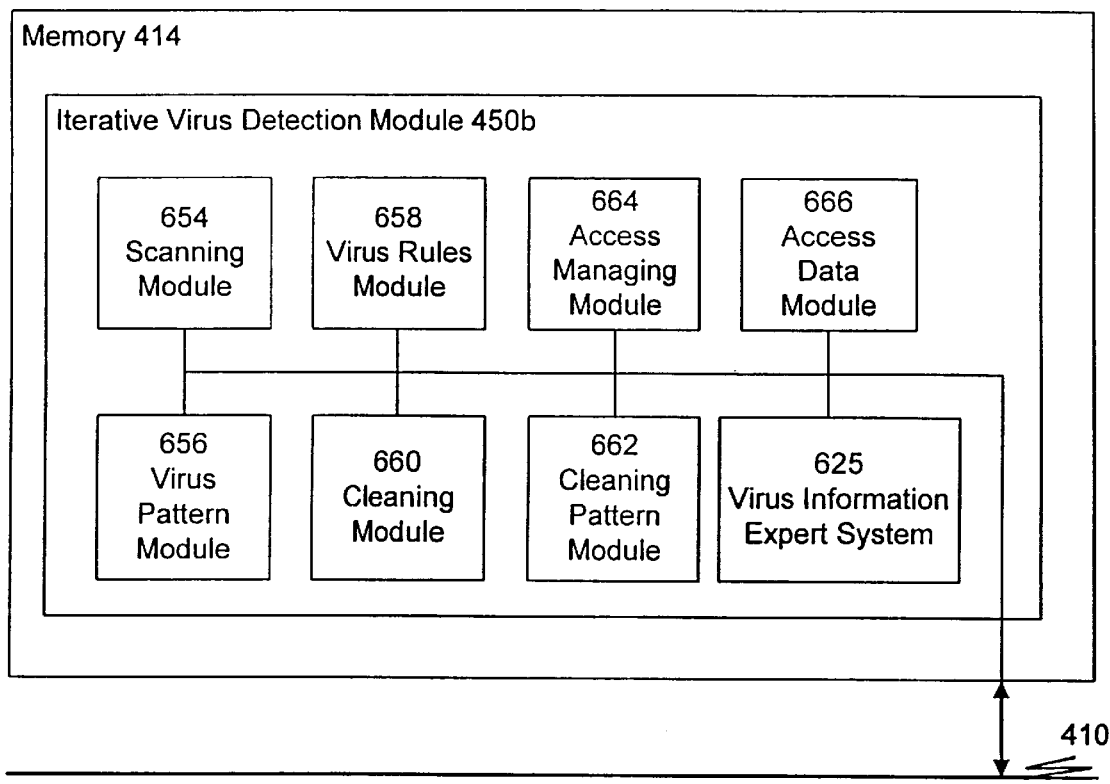
FIG. 6A is a block diagram illustrating another embodiment of an iterative virus detection module in accordance with the present invention.

Referring now to the block diagram of FIG. 6A, another embodiment of a virus detection server 450b is shown. The virus detection server 450b includes a scanning module 654, virus pattern module 656, virus rules module 658, cleaning module 660, cleaning pattern module 662, access managing module 664 and access data module 666 which are similar to the modules included with the virus detection server 450a of FIG. 4b. However, in addition to these modules, the virus detection server 450b includes a virus information expert system 625.

The virus information expert system 625 is in operative communication with the scanning module 654, virus rules module 658, virus pattern module 656, cleaning module 660, cleaning pattern module 662, access management module 664 and access data module 666. The virus information expert system 625 gather information and provided conditional data, applies the conditional data to predetermined knowledge or rules, and uses the knowledge based application of the gathered information to make determinations about the propriety of virus scanning, the scope and risk presented by the scanning targets, the selection of virus detection routines, and, where viruses are detected, the selection of treatment routines.

Figure 6B:
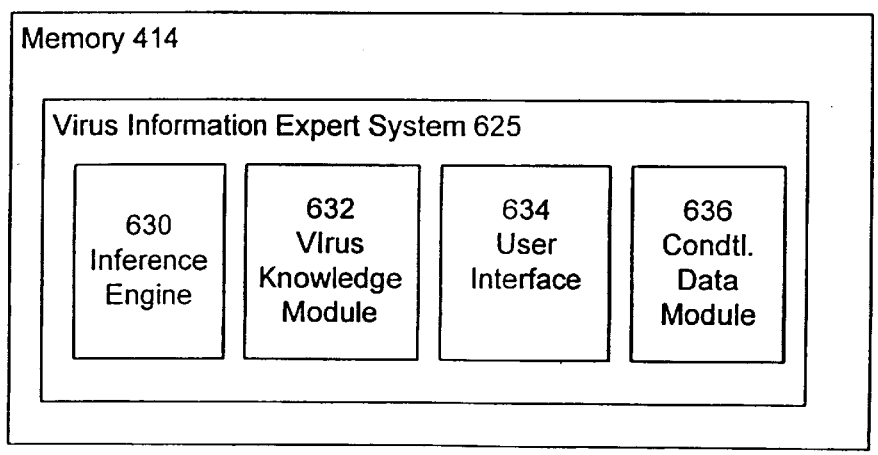
FIG. 6B is a block diagram illustrating an embodiment of a virus information expert system in accordance with the present invention.

Referring now to FIG. 6B, the virus information expert system 625 comprises an inference engine 630, a virus knowledge module 632, a user interface 634, and a conditional data module 636. The inference engine 630 is preferably a forward chaining type which determines results based upon a progression through a series of rules, preferably of the condition and corresponding action type. The ordinarily skilled artisan will recognize that various alternative inference engines, such as backward chaining type and those with fuzzy logic based reasoning, can be implemented. The user interface 634 is conventional and allows users to interface with the expert system 625 to provide knowledge or other types of updates. The virus knowledge module 632 comprises the information and rules used in conjunction with the various operations of the IVDM 450b. The inference engine 630 accesses conditional data from the conditional data module 636, and applies the conditional data to the rules provided in the virus knowledge module 632 in order to make virus scanning determinations used in the operation of the IVDM 450b. Specific determinations include the determination of whether a scan is appropriate, the assessment of the conditions pertaining to the request for scanning, and the type of scanning and cleaning routines to be implemented.

The conditional data includes factual information about scanning requests, predetermined conditions pertaining to clients 300 or other entities associated with scanning requests, and, optionally, information discovered during scanning operations. Additionally global information pertaining to all of the virus scanning performed by the IVDM 450b can be provided in the conditional data module 636 and used in virus scanning determinations. The information pertaining to a particular account or requester can be provided by network communication with the relevant party, such as a client 300 user or a network administrator. Additionally, information can be gathered by agent programs and provided to the conditional data module 636 without requiring user input.

In the preferred embodiment, the condition and action based rules in the virus knowledge module 632 are provided in an if . . . then format and are classified to facilitate knowledge updates. Preferred rule classes include those pertaining to scanning interval, condition diagnosis, and remedies. The scanning interval rules are used in the determination of whether scanning is to be undertaken, the diagnostic rules are used in the determination of whether viruses may be present and which scanning routines are appropriate dependent upon the conditions present, and the remedial rules are used to determine the appropriate response to the detection (or lack of detection) of a virus.

The scanning interval rules preferably include temporal and circumstantial conditions and corresponding actions. Some exemplary scanning interval rules are provided to illustrate the various conditions that could be determined and reacted to in accordance with the present invention: "if scanning has not been undertaken in timing interval a, then scan for viruses", "if targeted client has attempted internet access n times, then divide timing interval by 2", "if targeted client has attempted internet access o times, then scan for viruses", "if client has received p electronic mail messages with attachments, then scan for viruses", "if client has downloaded files from internet, then scan for viruses", "if a virus was detected at entity in communication with client, then scan for viruses", "if client has only communicated within local area network within interval b, then multiply timing interval by 2", "if previous virus scan was within c, then do not scan for viruses", and "if scanning has not been undertaken since time d, then scan for viruses."

The exemplary rules provide for virus scans at regular intervals and can adjust the interval, in either direction, dependent upon various conditions. Additionally, floor and ceiling intervals (c,d) are provided such that scanning is mandatory within certain intervals and such that unduly repetitive scanning is not undertaken. The ordinarily skilled artisan will recognize the various conditions and actions that can be applied in the determination of whether a virus scan is to be undertaken.

The conditional data module 636 provides the information applied to the rules in the knowledge module 632 by the inference engine 630. In the preferred embodiment, the conditions are initially provided in the conditional data module 636 and are updated by communication from a client, client agent, or other entity responsible for providing the information to the virus detection server 400. The conditions are periodically applied to the rules, and, under the appropriate conditions, a "request" for a virus scan is produced by the virus information expert system 625. As with the other IVDM 450a embodiment, the request can be received and validated using the access management module 664 and access data module 666. Various alternatives can be provided for the maintenance of conditional data and for the receipt and validation of requests. Specifically, the conditional data can be maintained and provided from resources other than the IVDM 450b. For example, a client 300, an agent program, or a network administrator could gather the appropriate information and transmit the information to the virus detection server 400. Further, information pertaining to a network could be provided in the form of a virus scanning request and the expert system 625 used to determine which clients 300 or other entities require scanning.

The diagnostic rules provided in the virus knowledge module 632 are used to make determinations analogous to those provided in the scope and risk assessment stages described with reference to the event diagram of FIG. 5. The diagnostic rules are applied to conditional data to determine, for a client, a group of clients, or other scannable entities corresponding to a virus scanning request, actions such as where scanning is to be performed and what type of scanning is to be performed. As with the scanning interval rules, the inference engine 630 applies the information in the conditional data module 636 to the rules in the virus knowledge module 632. The conclusions dictate the application of appropriate virus scanning routines, provided in the scanning module 654, using appropriate patterns and virus scanning rules.

The diagnostic rules preferably include circumstantial conditions and corresponding actions. The following exemplary diagnostic rules illustrate the various basic conditions that could be determined and reacted to in accordance with the present invention:

"if the scanning scope is indicated by the request for virus scanning, scan according to the request";

"if the scanning scope if not indicated by the request, determine whether the client includes writable media";

"if client does not include writable media, then do not perform virus scan";

"if a related scan detected Virus X, then scan client for Virus X";

"if the client includes a hard disk, then scan according to the conditions specific to the hard disk":

"if .exe files are present, then perform file virus signature scan",

"if .com files are present, then perform file virus signature scan",

"if application data files are present, then scan for macro viruses",

"if the client is a postal node, then scan all unread messages for attachments", "if the client has received electronic mail, scan uuencoded portions thereof", and "if client includes a Java applet execution engine, then scan for hostile Java applets";

"if the client includes other writable media, the determine the conditions specific to the writable media and scan the writable media."

The exemplary rules determine the basic scope of the scan based upon the conditions prevailing at the client. The scan can also be tailored to the conditions that prompted the request for a virus scan. For example, where the scan is triggered by voluminous receipt of electronic mail, only electronic mail messages might be scanned in lieu of the entire hard disk, particularly where the hard disk has been recently scanned.

Upon determination of a valid scan request and an assessment of the conditions presented at the client 300 by the virus information expert system 625, the identified targets are scanned for viruses. Preferably, the scanning is undertaken by the IVDM 450b using the scanning module 654, in communication with the virus pattern module 656 and virus rules module 658 using iteratively produced virus detection objects using the techniques described with reference to the IVDM 450a of FIG. 4B above. For example, where the virus information expert system 625 applies the conditions presented at a client 300 to the rules in the virus knowledge module 632 and it is determined that an entire hard disk is to be scanned for file type (e.g. .exe, .com) viruses, then the IVDM 450b produces virus detection objects that are used to iteratively determine whether the client 300 hard disk includes any file type viruses. Preferably, the virus signature portion techniques described with reference to FIG. 4D are used to determine whether any file type viruses reside at the client 300. Although iterative detection and corresponding techniques are preferred, it is understood that the virus information expert system 625 can prompt any type of scanning. For example, the virus information expert system 625 can prompt the IVDM 450b to download comprehensive signature scanning and corresponding detection signatures to the client 300, if desired. The indexing provided in the scanning, virus pattern and virus rules modules is used to ensure that the downloaded routines correspond to the desired type of detection.

If a virus is detected as a result of the virus scan, then the remedial stage commences and the routines provided by the cleaning module 660 are implemented, along with the cleaning pattern module 662, if necessary, to provide a remedy for the detected conditions. Preferably, virus treatment objects are produced to provide the remedy as described with reference to the IVDM 450a above. Optionally, the virus information expert system 625 provides knowledge based determinations regarding the types of remedial routines to be implemented. For example, the virus information expert system 625 determines whether files will be corrected to maintain their integrity, deleted entirely, or stripped of any viral portions. Additionally, determinations are made regarding the notification provided to the client 300 user, related users, network administrator, or other parties. Furthermore, other remedial actions, such as requesting a transfer prevention for certain classes of files corresponding to the type of virus detected can be implemented. Specifically, the IVDM 450b, at the request of the expert system 625 can send an email to a network administrator indicating that a certain type of file included a virus and was transmitted into the network, or can communicate directly with a network computer, such as a server including a proxy server, to provide reconfiguration instructions to block the entry of the types of files in which a virus was detected.

Figure 7:
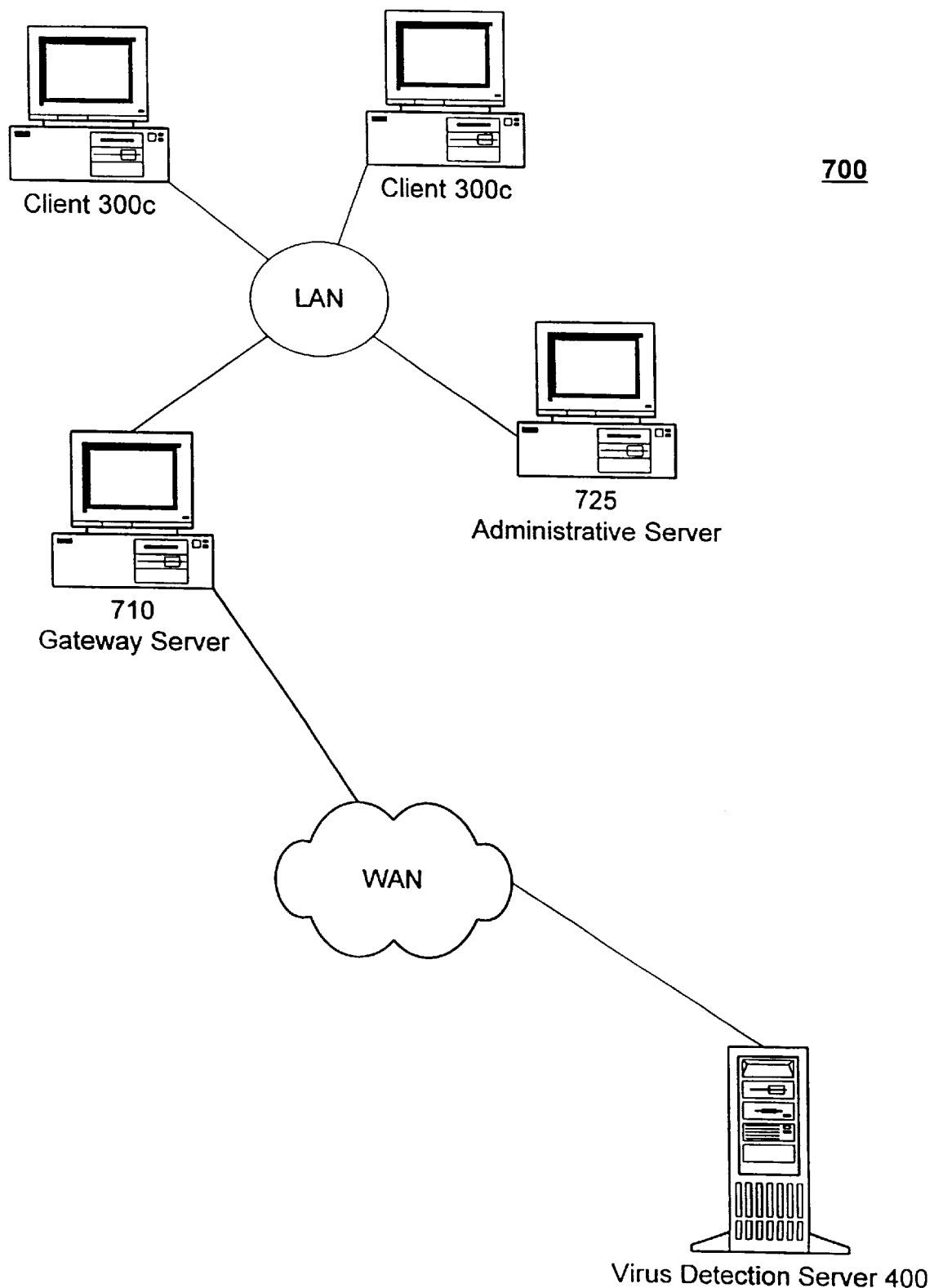
FIG. 7 is a schematic illustrating an exemplary network communication system in accordance with the present invention.

Referring now to the schematic diagram of FIG. 7, an exemplary network communication system 700 includes a local area network (LAN) with clients 300c, a gateway server 710 and an administrative server 750. The gateway server 710 operates an entrance to another network, here the WAN, and the administrative server 725 is a server, within the LAN, that performs administrative functions. As with FIG. 1, the virus detection server 400 resides on the WAN, and a client server relationship can be established between the virus detection server and the clients 300c or, alternatively, between the virus detection server 400 and the gateway server 710 or administrative server 725 (with the gateway server 710 or administrative server 725 being the client). The connections can be established using conventional media and conventional network transmission protocols.

Figure 8A:
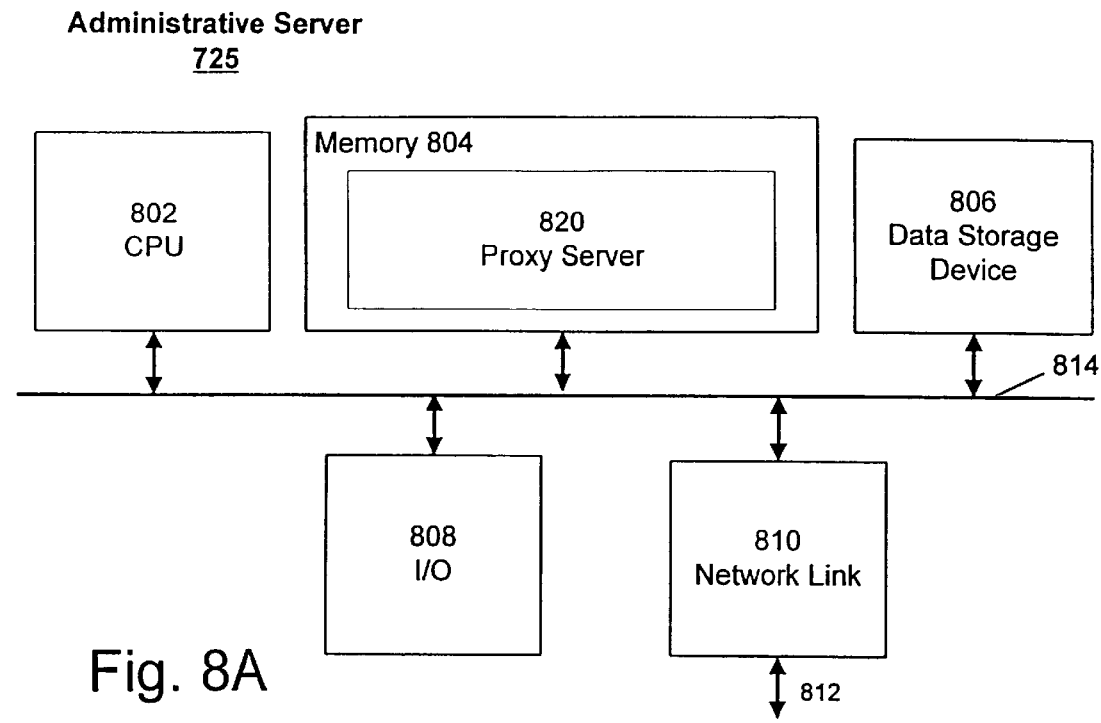
FIG. 8A is a block diagram illustrating an embodiment of an administrative server in accordance with the present invention.

Referring now to the block diagram of FIG. 8A, an embodiment of an administrative server 725 in accord with the present invention comprises a CPU 802, memory 804, data storage device 806, I/O ports 808 and a network link 810. The CPU 802 is a conventional processor, the memory 804 is conventional addressable memory (such as RAM), and the I/O ports 808 and network link 810 are conventional. The CPU 802, memory 804, I/O ports 808 (and corresponding devices), and network interface 810 are coupled to a bus 814 in conventional fashion. The CPU 802 performs functions under the guidance and control provided by instructions received from memory 804, the functions including communications through network media 812 using the network interface 810. The memory 804 also includes a proxy server 820. The proxy server 804 acts on behalf of other servers or clients in informational exchanges. Although various proxy server 804 types can be provided, a preferred proxy server 804 gathers Internet requests from network computers such as clients 300c, communicates the requests to Internet servers, and receives responses from the Internet servers for communication with the requester (such as the clients 300c).

Figure 8B:
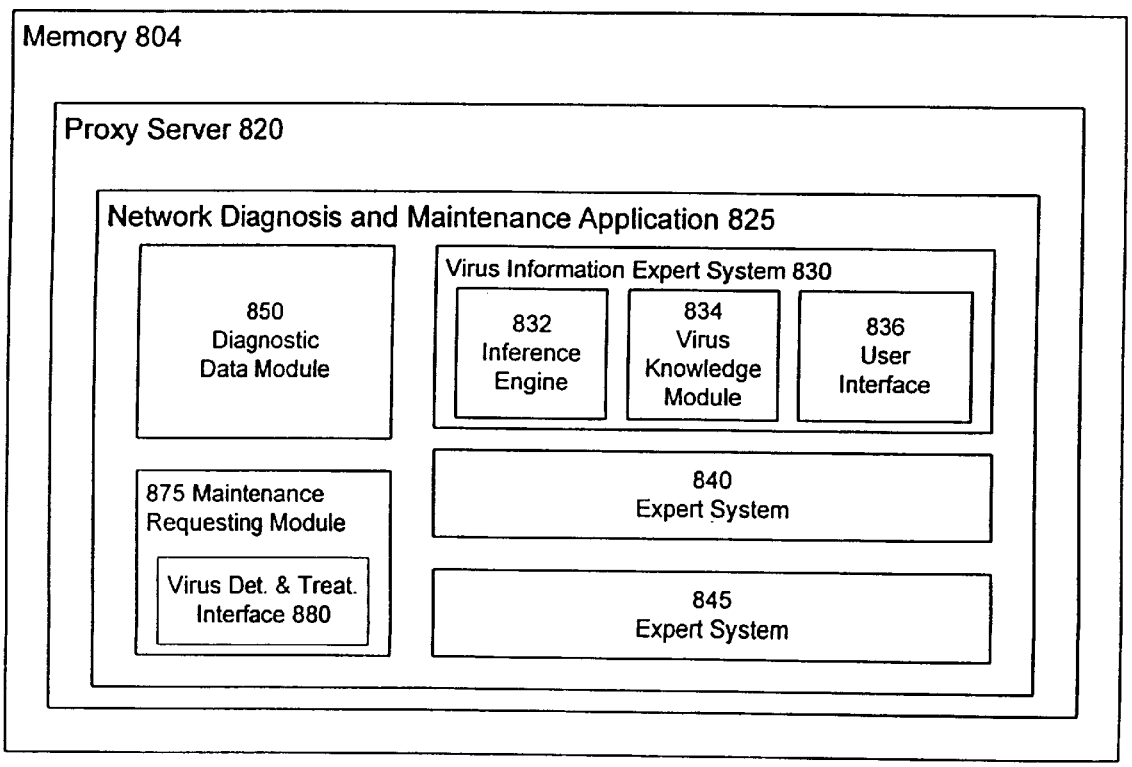
FIG. 8B is a block diagram illustrating an embodiment of a network diagnosis and treatment application in accordance with the present invention.

Referring now to the block diagram of FIG. 8B, the memory 804 is shown to further include an embodiment of a network diagnosis and maintenance application 825 in accordance with the present invention. The network diagnosis and maintenance application 825 can reside separate from the proxy server 804 or can be bundled with the proxy server 804. The network diagnosis and maintenance application 825 comprises a virus information expert system 830, a diagnostic data module 850 and a maintenance requesting module 875. The application 825 also includes optional additional expert systems 840, 845, such as a network response expert system and an application software expert system. The application 825 includes routines for gathering information pertaining to the network, producing and maintaining diagnostic data using the gathered information, making determinations concerning network conditions by applying the diagnostic data to predetermined knowledge, and generating requests for network maintenance based upon the determinations. The network diagnosis and maintenance application 825 is preferably computer software, but can also be hardware or firmware.

Generally, the application 825 operates as follows. The diagnostic data module 850 includes routines for gathering information pertaining to the network and producing diagnostic data from the gathered information. The diagnostic data module 850 is in communication with the expert systems 830, 840, 845 and thus facilitates their access of the diagnostic data. Preferably, each expert system 830, 840, 845 includes an inference engine, a knowledge module, and an interface. The interface is a conventional type interface, such as a menu driven one, which allows users to communicate with the system. The knowledge module provides a knowledge base, typically in the form of information and rules which are specific to the task to be performed. The inference engine is a conventional type such as a forward chaining type. The inference engine accesses conditional data in the diagnostic data module 850 and applies the conditional data to the information and rules in the knowledge module to make determinations about conditions on the network. The expert systems make specific diagnostic determinations pertaining to their field of expertise. The expert systems are also in communication with the maintenance requesting module 875, and provide their diagnostic determinations to the module 875, which produces requests for maintenance. Typically, requests are made to resources outside of the local area network, such as a virus detection server 400, to provide the maintenance.

An exemplary expert system is the virus information expert system 830. This system 830 analyzes network activity to conditional determinations including when virus scanning is to be performed, where virus scanning is to be performed, the general type of virus scanning to be performed, and the preferred remedies where viruses are detected. These determinations are provided to the maintenance requesting module 875 which communicates a request for virus scanning to the virus detection server 400 and provides the virus detection server with the conditional determinations. Other expert systems 840, 845 could be provided in accordance with the present invention. For example, a network response expert system 840 could monitor network activity to ensure response time adequacy, could make determinations as to whether outside resources should be sought to solve any inadequacies, such as by lowering the burden on local resources. Additionally, an application software expert system 845 could determine the conditions for providing software updates. Again, the determination that an update is required could prompt a request for the update from remote resources. Although exemplary additional expert systems, such as a network response expert system 840 and an application software expert system 845 are disclosed, the artisan will recognize various alternative expert systems.

Referring again to the virus information expert system 830, the virus knowledge module 834 has various rule classes including those for scanning interval and condition diagnosis. The scanning interval rules are used to determine whether scanning is to be undertaken, and include temporal and circumstantial conditions and corresponding actions. The diagnostic rules also include circumstantial conditions and corresponding actions and are used to make determinations analogous to those provided in the scope (e.g. which media, directories, files are to be scanned) and risk assessment (e.g. which files or data in the defined scope might contain viruses) stages of virus treatment. Exemplary scanning interval and condition diagnosis rule sets are described with reference to the IVDM 450b resident expert system 625. Additionally, as with that system, rules pertaining to the selection of remedies upon the detection of a virus can be provided.

The diagnostic data module 850 is in communication with the proxy server 820 and is coupled to the local network transmission medium 812 to gather information about the network. Preferably, the information includes which clients 300c have attempted internet access, what types of operations and protocols were used in communications between each client 300c and other entities including those outside the network. This information is readily ascertainable by analysis of the data packets traversing the network medium or by communication directed from, for example, the proxy server 820 to the diagnostic data module 850. For example, an HTTP proxy server arranged to handle all HTTP requests by the clients 300c could merely identify the client and corresponding request to the diagnostic data module, and an FTP proxy server arranged to handle file transfers could indicate which clients 300c obtained file downloads using the relevant protocol as well as an identity of the source of the transferred file. In addition to the gathered information, background information about each client 300c, such as that concerning its CPU and storage media (e.g. hard disk) is provided in the diagnostic data module 850. Furthermore, related information such as the timing of the most recent virus scan for each client 300c is provided. The diagnostic data which is applied by the expert system to the knowledge base comprises all of this information, which is conventionally stored in the diagnostic data module 850. Of course, other information is provided dependent upon the types of additional expert systems 840, 845 which are provided.

The expert systems 830, 840, 845 access the diagnostic data and make determinations concerning network conditions by applying the diagnostic data to the predetermined knowledge. Specifically, with the virus information expert system 830, the inference engine 832 applies the diagnostic data such as that relating to last scan, electronic mail receipt, file downloading, attempted internet access to the scanning interval rules provided in the virus knowledge module 834 in order to determine when a virus scan should be requested and applies the diagnostic data such as that relating to storage media and types of files downloaded in order to determine the extent of any requested virus scan.

The expert systems 830, 840, 845 are also in communication with the maintenance requesting module 875. Thus, once a determination is made that network maintenance is required, the systems 830, 840, 845 prompt the module 875 to generate a corresponding request. Specifically, in conjunction with the virus information expert system 830, the maintenance requesting module 875 directs a request for virus scanning to the virus detection server 400. In a simple case, the request pertains to a single client 300c for a comprehensive scan. However, all or selected clients 300c, storage devices, or other entities residing on the network could be scanned. To make a particular request for scanning, including which media, directories or files are to be scanned, what types of files are to be scanned, and what remedies are sought, the maintenance requesting module 875 includes an virus detection and treatment interface 880 for providing customized communication with the virus detection server 400.

The initial request, determination of request validity, and subsequent scanning stage are described with reference to the virus detection server 400. Although iterative virus detection techniques are preferably arranged and performed by a WAN resident virus detection server 400, it is understood that any resources using any scanning and treatment protocols can be implemented at the request of the network diagnosis and treatment application 825. For example, the request for virus scanning by the application 825 can initiate the downloading of comprehensive virus signatures and/or scanning routines, or the performance of a scan upon the targeted client 300c by a LAN resident server using conventional signature scanning techniques.

Once the virus scanning has been performed, the determination as to whether a virus was detected, and the remedial result can be communicated to the network diagnosis and maintenance application 825, preferably using the treatment interface 880. As with the remedial stage described above, the remedy can include file deleting, file stripping, file amending, and various types of party notification. The results can be used to update the diagnostic data module 850 so that future scans can account for the determinations of previous scans. Additionally, various network elements, including the proxy server 820, can be notified or reconfigured as a result of the scan. Specifically, if a particular file corresponding to a particular transfer protocol was found to contain a virus, the appropriate proxy server can be reconfigured to block passage of that file type in the future. Additionally, using the source identification provided in the diagnostic data module 850, future file transfers from the source of the infected file could be blocked, the source could be notified, or the clients 300c on the network could be notified about the source of the infected file.

Although the present invention has been described with reference to certain preferred embodiments, those skilled in the art will recognize that various modifications may be provided. For example, although separate modules for access managing, scanning and cleaning are shown and described, it is understood that the various processes may be integrated into common modules or subdivided into additional modules which perform equivalent functions for receiving virus scanning requests, validating them, diagnosing and detecting viruses, and treating viruses. Additionally, although certain iterations in the detection and treatment of viruses are described, it is understood that the correspondence between each iteration and the function or functions performed in each iteration can vary. These and other variations upon and modifications to the described embodiments are provided for by the present invention which is limited only by the following claims.

What is claimed is:

1. For use in a system wherein a client and a server communicate with each other, a method for detecting viruses, the method comprising:

transmitting a first virus detection object from the server to the client;

receiving a result based upon execution of the first virus detection object;

producing a second virus detection object based upon a result of the execution of the first virus detection object;

transmitting the second virus detection object from the server to the client;

receiving a result based upon execution of the second virus detection object; and determining whether a virus is present at the client based upon the result of the execution of the second virus detection object.

2. The method of claim 1, further comprising:

if it is determined that a virus is present at the client, tailoring a remedy for the virus based upon at least one of the result of the execution of the first virus detection object and the result of the execution of the second virus detection object.

3. The method of claim 2, wherein the tailoring a remedy comprises:

producing a virus treatment object and transmitting the virus treatment object from the server to the client; and executing the virus treatment object at the client.

4. The method of claim 1, further comprising:

determining whether a virus scan is to be performed prior to the transmitting a first virus detection object from the server to the client.

5. The method of claim 4, wherein the determining whether a virus scan is to be performed comprises detecting a request for a virus scan and determining the validity of virus scan request.

6. The method of claim 5, wherein the request is prompted by a triggering event.

7. The method of claim 6, wherein the triggering event is the first attempted internet access by the client after a predetermined time interval from a previous virus scan.

8. The method of claim 1, wherein the first virus detection object and the second virus detection object correspond to a virus scanning stage.

9. The method of claim 8, wherein the first virus detection object is used to determine whether a first virus signature portion is present in targeted files and the second virus detection object is used to determine whether a second virus signature portion is present in those targeted files that include the first virus string portion.

10. For use in a system wherein a client and a server communicate with each other, an apparatus for detecting viruses, the apparatus comprising:

means for transmitting a first virus detection object from the server to the client;

means for receiving a result based upon execution of the first virus detection object;

means for producing a second virus detection object based upon a result of the execution of the first virus detection object;

means for transmitting the second virus detection object from the server to the client;

means for receiving a result based upon execution of the second virus detection object; and means for determining whether a virus is present at the client based upon the result of the execution of the second virus detection object.

11. The apparatus of claim 10, further comprising:

means for tailoring a remedy for a detected virus based upon at least one of the result of the execution of the first virus detection object and the result of the execution of the second virus detection object.

12. The apparatus of claim 10, further comprising:

means for detecting a request for a virus scan; and means for determining the validity of the virus scan request.

13. The apparatus of claim 12, wherein the request is prompted by a triggering event.

14. The apparatus of claim 13, wherein the triggering event is the first attempted internet access by the client after a predetermined time interval from a previous virus scan.

15. The apparatus of claim 10, wherein the first virus detection object and the second virus detection object correspond to a virus scanning stage.

16. The apparatus of claim 15, wherein the first virus detection object is used to determine whether a first virus signature portion is present in targeted files and the second virus detection object is used to determine whether a second virus signature portion is present in those targeted files that include the first virus string portion.

17. A virus detection server for detecting viruses, the virus detection server comprising:

a processor; and a memory, in communication with the processor, the memory providing instructions which, when executed by the processor, cause the processor to transmit a first virus detection object from the virus detection server to a client; receive a result based upon execution of the first virus detection object; produce a second virus detection object based upon a result of the execution of the first virus detection object; transmit the second virus detection object from the server to the client; receive a result based upon execution of the second virus detection object; and determine whether a virus is present at the client based upon the result of the execution of the second virus detection object.

18. The virus detection server of claim 17, wherein the first virus detection object is used to determine whether a first virus signature portion is present in targeted files and the second virus detection object is used to determine whether a second virus signature portion is present in those targeted files that include the first virus string portion.

19. A network diagnosis and maintenance apparatus for diagnosing and maintaining a network, the apparatus comprising:

a diagnostic data module which provides diagnostic data pertaining to the network;

an expert system, in communication with the diagnostic data module, which provides knowledge for the diagnosis and maintenance of the network, which applies the diagnostic data to the knowledge, and which makes determinations based upon the application of the diagnostic data to the knowledge; and a maintenance requesting module, in communication with the expert system, which requests network maintenance based upon the determinations made by the expert system;

wherein the expert system is a virus information expert system which comprises:

a virus knowledge module, which provides virus scanning rules, the virus scanning rules including interval rules for determining whether a virus scan should be requested and diagnostic rules for determining the scope and type of virus scanning; and an inference engine, in communication with the virus knowledge module, which accesses the diagnostic data, which applies the diagnostic data to the virus scanning rules, and which makes virus scanning determinations based upon the application of the diagnostic data to the rules.

20. The network diagnosis and maintenance apparatus of claim 19 wherein the apparatus resides within a local area network, and the maintenance requesting module directs a request for virus scanning to a virus detection server that resides outside of the local area network.

21. A method for diagnosing and maintaining a network, the method comprising:

providing diagnostic data pertaining to the network;

providing knowledge for the diagnosis and maintenance of the network;

applying the diagnostic data to the knowledge;

making determinations based upon the application of the diagnostic data to the knowledge;

requesting network maintenance based upon the determinations;

providing virus scanning rules, the virus scanning rules including interval rules for determining whether a virus scan should be requested and diagnostic rules for determining the scope of virus scanning;

applying the diagnostic data to the virus scanning rules; and making virus scanning determinations based upon the application of the diagnostic data to the rules.

22. The method of claim 21, wherein the request for virus scanning is directed to a virus detection server based upon the step of making virus scanning determinations.

23. A virus detection server capable of communicating with a client over a network, the virus detection server comprising:

an access managing module which receives requests for virus scanning, the request corresponding to a client to be scanned for viruses;

a virus scanning module which provides routines used in the detection of viruses; and a virus information expert system, in communication with the access managing module and the virus scanning module, which provides conditional data pertaining to clients to be scanned for viruses; which provides virus scanning rules including interval rules for determining whether a virus scan should be requested and diagnostic rules for determining the scope and type of virus scanning; which applies the conditional data to the virus scanning rules; and which makes virus scanning determinations based upon the application of the conditional data to the rules.

24. The virus detection server of claim 23, further comprising:

a virus cleaning module, in communication with the virus information expert system which provides routines used in the treatment of viruses.

25. The virus detection server of claim 24, further comprising:

means for selecting routines for the detection and treatment of viruses based upon the virus scanning determinations made by the virus information expert system and transmitting the selected routines to the client.

26. A method for detecting viruses, the method comprising:

receiving requests for virus scanning, the request corresponding to a client to be scanned for viruses;

providing a plurality of routines used in the detection of viruses;

providing conditional data pertaining to clients to be scanned for viruses;

providing virus scanning rules including interval rules for determining whether a virus scan should be requested and diagnostic rules for determining the scope and type of virus scanning;

applying the conditional data to the virus scanning rules; and making virus scanning determinations based upon the application of the diagnostic data to the rules.

27. The method of claim 26, further comprising:

providing a plurality of routines used in the treatment of viruses.

28. The method of claim 27, further comprising:

selecting routines for the detection and treatment of viruses based upon the making virus scanning determinations; and transmitting the selected routines to the client.

* * * * *